United States Patent
Lim et al.

(10) Patent No.: US 9,934,100 B2
(45) Date of Patent: Apr. 3, 2018

(54) METHOD OF CONTROLLING MEMORY SWAP OPERATION AND DATA PROCESSING SYSTEM USING SAME

(71) Applicant: SAMSUNG ELECTRONICS CO., LTD., Suwon-si, Gyeonggi-Do (KR)

(72) Inventors: Sun-Young Lim, Hwaseong-si (KR); Sung-Yong Seo, Seongnam-si (KR); Young-Jin Cho, Seoul (KR); Ju-Yun Jung, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 331 days.

(21) Appl. No.: 14/637,955

(22) Filed: Mar. 4, 2015

(65) Prior Publication Data
US 2015/0261616 A1    Sep. 17, 2015

(30) Foreign Application Priority Data

Mar. 11, 2014 (KR) .................. 10-2014-0028269

(51) Int. Cl.
| | |
|---|---|
| G06F 13/36 | (2006.01) |
| G06F 11/14 | (2006.01) |
| G06F 13/28 | (2006.01) |
| G06F 12/08 | (2016.01) |
| G06F 12/1009 | (2016.01) |
| G06F 12/121 | (2016.01) |

(52) U.S. Cl.
CPC .......... *G06F 11/1446* (2013.01); *G06F 12/08* (2013.01); *G06F 13/28* (2013.01); *G06F 12/1009* (2013.01); *G06F 12/121* (2013.01); *G06F 2212/655* (2013.01)

(58) Field of Classification Search
None
See application file for complete search history.

(56) References Cited

U.S. PATENT DOCUMENTS

| | | | | |
|---|---|---|---|---|
| 5,758,113 | A * | 5/1998 | Peet, Jr. | G06F 9/3824 |
| | | | | 712/203 |
| 7,552,263 | B2 | 6/2009 | Lee | |
| 8,214,845 | B2 * | 7/2012 | Hoover | G06F 15/7825 |
| | | | | 711/147 |
| 8,423,740 | B2 | 4/2013 | Koning | |
| 8,788,739 | B2 * | 7/2014 | Chang | G06F 9/5016 |
| | | | | 711/165 |
| 2010/0312955 | A1 | 12/2010 | Hwang et al. | |
| 2010/0323678 | A1 | 12/2010 | Corda et al. | |
| 2010/0325331 | A1 | 12/2010 | Hsieh | |

(Continued)

FOREIGN PATENT DOCUMENTS

| | | |
|---|---|---|
| JP | 2008217208 | 9/2008 |
| JP | 2011095885 | 5/2011 |

*Primary Examiner* — Idriss N Alrobaye
*Assistant Examiner* — Richard B Franklin
(74) *Attorney, Agent, or Firm* — Volentine & Whitt, PLLC

(57) ABSTRACT

A memory swap operation comprises writing information about a process in which a page fault occurred, into a temporary memory using a processor of a host, copying a page in which the page fault occurred, from a memory device recognized as a swap memory into a main memory of the host, and after completing the copying of the page, resuming the process in which the page fault occurred, using the information about the process, written in the temporary memory.

17 Claims, 16 Drawing Sheets

(56) References Cited

U.S. PATENT DOCUMENTS

| | | |
|---|---|---|
| 2012/0151127 A1 | 6/2012 | Lim |
| 2012/0254520 A1 | 10/2012 | Roh et al. |
| 2013/0013877 A1 | 1/2013 | Tian |
| 2013/0205067 A1 | 8/2013 | Kettner |
| 2013/0219399 A1* | 8/2013 | Wang ................ G06F 9/30003 718/102 |

* cited by examiner

METHOD OF CONTROLLING MEMORY SWAP OPERATION AND DATA PROCESSING SYSTEM USING SAME

CROSS-REFERENCE TO RELATED APPLICATIONS

This application claims priority under 35 USC 119 to Korean Patent Application No. 10-2014-0028269 filed on Mar. 11, 2014, the subject matter of which is hereby incorporated by reference.

BACKGROUND OF THE INVENTION

The inventive concept relates generally to a memory control method and a memory control apparatus. More particularly, certain embodiments of the inventive concept relate to a memory swap operation control method and a data processing system using the same.

Memory systems often use a memory swap operation to free up space in a main memory where the main memory becomes full. In a typical memory swap operation, the memory system identifies inactive portions of the main memory and transfers data from those portions to a swap memory, which may be located in a hard disk drive, solid state drive, or some other form of long term data storage.

Memory swap operations can be detrimental to overall system performance, for instance, due to the time required to move data from the main memory to the swap memory. Accordingly, there is a general demand for improvements in the speed of memory swap operations.

SUMMARY OF THE INVENTION

In one embodiment of the inventive concept, a method comprises writing information about a process in which a page fault occurred, into a temporary memory using a processor of a host, copying a page in which the page fault occurred, from a memory device recognized as a swap memory into a main memory of the host, and after completing the copying of the page, resuming the process in which the page fault occurred, using the information about the process, written in the temporary memory.

In another embodiment of the inventive concept, a data processing system comprises a processor that performs data processing based on input information and drives a swap application program interface (API) in response to a page fault of a memory, and a main memory that exchanges data with the processor. The swap API sequentially performs a first operation for storing information about a process in which the page fault occurred, in a first storage area, a second operation for copying a page in which the page fault occurred, into the main memory according to a direct memory access (DMA) process, wherein the page in which the page fault occurred is stored in a memory device recognized as a swap memory, and a third operation for resuming the process in which the page fault occurred using the information about the process, stored in the first storage area, after the second operation is completed.

In yet another embodiment of the inventive concept, a system comprises a host comprising a main memory, and a processor configured to write information into a temporary memory in response to a page fault of a memory, the information referencing a process in which the page fault occurred, a memory device recognized as a swap memory, and a controller configured to copy a page in which the page fault occurred, from the memory device recognized as the swap memory into the main memory of the host, and further configured to resume the process in which the page fault occurred using the information referencing the process, after completing the copying of the page.

These and other embodiments of the inventive concept can potentially improve the speed of memory swap operations through the use of direct memory access and other processes.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

The terms in this specification are used to describe particular embodiments, and are not intended to limit the inventive concept. An expression used in the singular encompasses the expression of the plural, unless it has a clearly different meaning in the context. In this specification, terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which this invention belongs. Terms such as those defined in commonly used dictionaries should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," where preceding a list of elements, modify the entire list of elements and do not modify the individual elements of the list.

FIGS. 1A to 5B show block diagrams of various electronic devices 100A to 100M according to embodiments of the inventive concept. Examples of electronic devices 100A to 100M illustrated in FIGS. 1A to 5B may comprise devices, such as a computer, a mobile phone, a smartphone, a personal digital assistant (PDA), a portable multimedia player (PMP), an MP3 player, a camera, a camcorder, and a smart card.

Figure 1A:
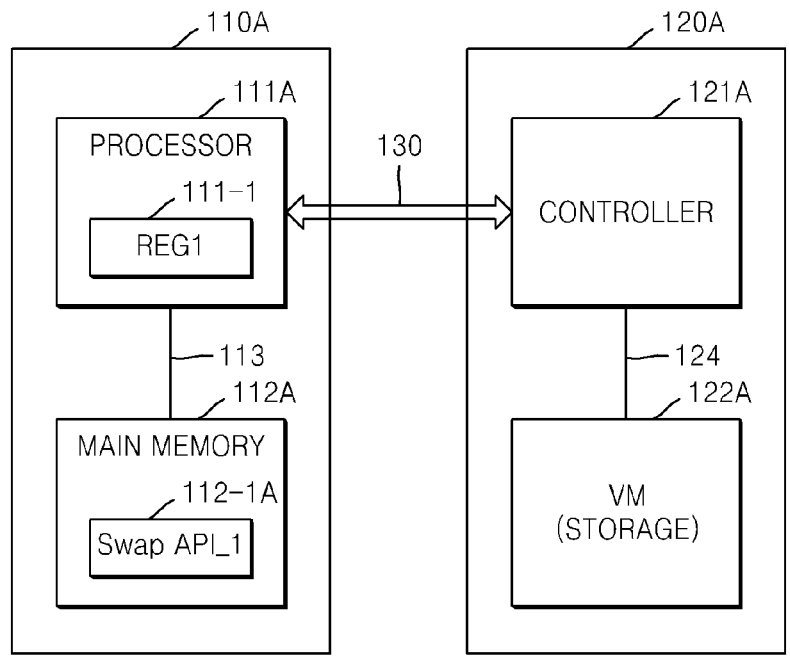
FIG. 1A is a block diagram of an electronic device according to an embodiment of the inventive concept.
Figure 1B:
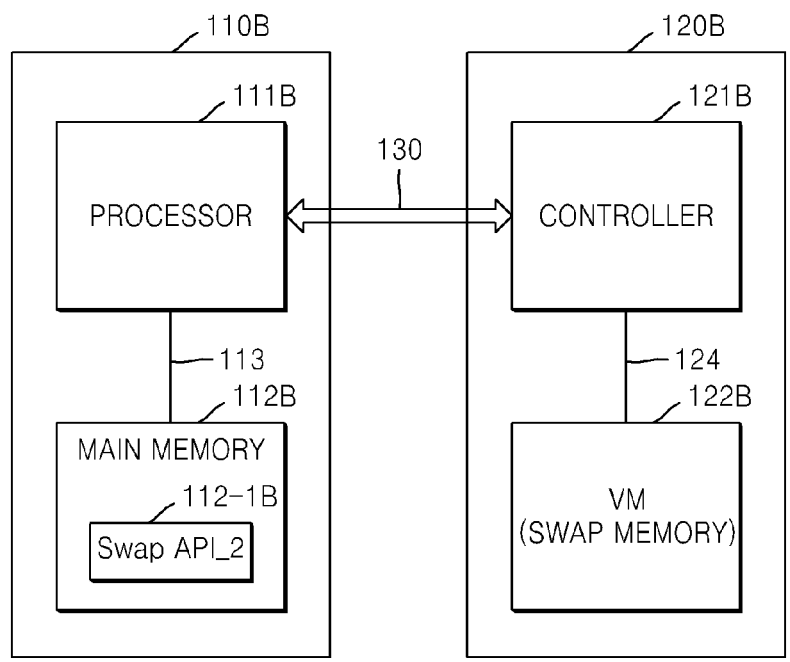
FIG. 1B is a block diagram of an electronic device according to another embodiment of the inventive concept.
Figure 1C:
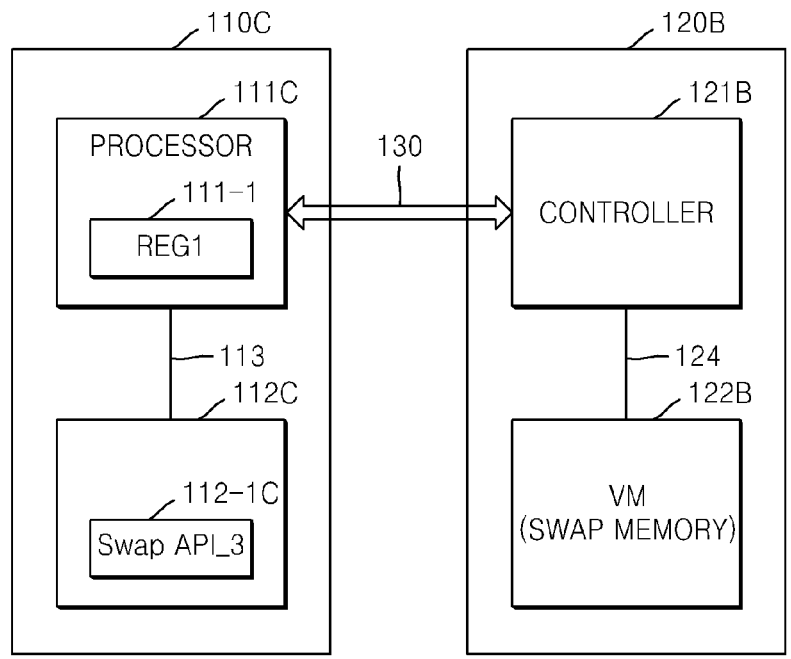
FIG. 1C is a block diagram of an electronic device according to still another embodiment of the inventive concept.

FIGS. 1A to 1C are block diagrams of electronic devices 100A to 100C according to some embodiments of the inventive concept.

Referring to FIG. 1A, electronic device 100A comprises a host 110A and a memory system 120A. Host 110A comprises a processor 111A and a main memory 112A.

Processor 111A performs specific calculations or applications for processing tasks. For example, processor 111A may be a microprocessor or a central processing unit (CPU). Processor 111A is electrically connected to main memory 112A. Processor 111A may be connected to main memory 112A via a bus 113 comprising an address bus, a control bus, and/or a data bus.

Processor 111A comprises a temporary memory 111-1 storing information about a process in which a page fault occurred. The information stored in temporary memory 111-1 may comprise, for instance, an identifier (ID) of a process in which a page fault occurred. Alternatively, the information stored in temporary memory 111-1 may comprise request information for reading an ID of a process, in which a page fault occurred, and a page, in which the page fault occurred, from a volatile memory 122A, which is a storage device of memory system 120A, and for storing the read ID and page in main memory 112A. A storage area in which the page fault is written may be defined as a first storage area.

Temporary memory 111-1 may be a register REG1, for example, and temporary memory 111-1 may be disposed outside processor 111A. The first storage area storing information about a process in which a page fault occurred may be assigned to a specific area of main memory 112A instead of temporary memory 111-1.

Main memory 112A stores a program Swap API_1 for performing a memory swap operation according to an embodiment of the inventive concept. Main memory 112A may be, for example, dynamic random access memory (DRAM) or static random access memory (SRAM).

Memory system 120A comprises a controller 121A and volatile memory 122A. Controller 121A transmits/receives information to/from processor 111A of host 110A via a wired or wireless interface 130.

Controller 121A is electrically connected to volatile memory 122A. Controller 121A is connected to volatile memory 122A via a bus 124 comprising an address bus, a control bus, and/or a data bus.

Volatile memory 122A is recognized as a storage device by processor 111A of host 110A. Where a power supply is cut off, data stored in volatile memory 122A is lost. Swap data may be stored in volatile memory 122A. For example, volatile memory 122A may be DRAM or SRAM.

Controller 121A writes data transmitted from host 110A to volatile memory 122A or reads data from volatile memory 122A and then transmit the read data to host 110A, in response to a command received from host 110A.

Electronic device 100A may be implemented with a virtual memory system enabling the execution of large-scale software by using a limited capacity of main memory 112A. The virtual memory system is a memory system for addressing limitations of the capacity of main memory 112A, compared to the size of actual software. Only an address space area required for the execution of a current task is stored in main memory 112A, rather than storing address space areas of all tasks in main memory 112A. Remaining address space areas are stored in memory system 120A that is an auxiliary memory device.

A memory swap operation performed in electronic device 100A is described below.

Where a page fault occurs, processor 111A drives the program Swap API_1 stored in main memory 112A. A page fault occurs where a page to be read to perform an application process is not stored in main memory 112A. Where a page fault occurs, the following steps 1a to 3a are performed by the program Swap API_1.

In a step 1a, information about a process in which a page fault occurred is written into temporary memory 111-1. For example, an ID of a process in which a page fault occurred may be written into temporary memory 111-1. As another example, request information may be written into temporary memory 111-1, where the request information is information for copying an ID of a process, in which a page fault occurred, and a page, in which the page fault occurred, from volatile memory 122A, which is a storage device of memory system 120A, into main memory 112A.

In a step 2a, an operation for copying a page, in which a page fault occurred, from volatile memory 122A recognized as a storage device into main memory 112A, is performed based on a storage access process.

In a step 3a, after completing Step 2a, processor 111A resumes a process corresponding to a process ID stored in temporary memory 111-1. Where an operation in which the page in which a page fault occurred is loaded in main memory 112A is completed according to step 2a, processor 111A may perform a wake-up process on a process that is directed by a process ID stored in temporary memory 111-1.

As described above, where the page in which a page fault occurred is loaded in main memory 112A where the program Swap API_1 is executed, processor 111A may immediately resume a process in a sleep state due to the occurrence of a page fault.

Referring to FIG. 1B, electronic device 100B comprises a host 110B and a memory system 120B.

Host 110B comprises a processor 111B and a main memory 112B. Processor 111B may be, for example, a microprocessor or a CPU. Processor 111B is electrically connected to main memory 112B via a bus 113 comprising an address bus, a control bus, and/or a data bus.

Main memory 112B stores a program Swap API_2 for performing a memory swap operation according to another embodiment of the inventive concept. Main memory 112B may be, for example, DRAM or SRAM.

Memory system 120B comprises a controller 121B and volatile memory 122B. Controller 121B of memory system 120B transmits/receives information to/from processor 111B of host 110B via wired or wireless interface 130.

Controller 121B is electrically connected to volatile memory 122B via a bus 124 comprising an address bus, a control bus, and/or a data bus. Volatile memory 122B is recognized as a swap memory by processor 111B of host 110B. Swap data may be stored in volatile memory 122B. For example, volatile memory 122B may be DRAM or SRAM.

Where memory system 120B is connected to host 110B, processor 111B of host 110B may recognize volatile memory 122B of memory system 120B as a swap memory and register volatile memory 122B recognized as a swap memory in a memory map.

Controller 121B writes data transmitted from host 110B to volatile memory 122B or read data from volatile memory 122B and then transmit the read data to host 110B, according to a command received from host 110B.

Electronic device 100B may be implemented with a virtual memory system enabling the execution of large-scale software by using a limited capacity of main memory 112B.

A memory swap operation of electronic device 100B is described below.

Where a page fault occurs, processor 111B drives the program Swap API_2 stored in main memory 112B. A page fault occurs where a page which processor 111B desires to read to perform an application process is not stored in main memory 112B.

Where a page fault occurs, the following steps 1b to 2b are performed by the program Swap API_2.

In a step 1b, an operation for copying a page, in which a page fault occurred, into main memory 112B is performed, where the page in which a page fault occurred is stored in volatile memory 122B recognized as a swap memory, based on direct memory access (DMA). Processor 111B recognizes volatile memory 122B of memory system 100B as a memory. Accordingly, an operation for reading the page, in which a page fault occurred, from volatile memory 122B recognized as a swap memory, based on DMA and then writing the read page into main memory 112B is performed. Due to this, where a page fault occurs, access to a swap memory may be performed first due to DMA.

In a step 2b, after completing step 1b, processor 111B resumes a process that was interrupted when a page fault occurred. For example, after the page in which a page fault occurred is stored in main memory 112B according to step 1b, processes in which sleep occurred wait for a wake-up process to be performed based on an order depending on an initially set rule. Because access to a swap memory may be performed first due to DMA as described above where the program Swap API_2 is executed, a processing speed may be improved.

Referring to FIG. 1C, electronic device 100C comprises a host 110C and a memory system 120B.

Host 110C comprises a processor 111C and a main memory 112C. Processor 111C performs specific calculations or applications for processing tasks. For example, processor 111C may be a microprocessor or a CPU. Processor 111C is electrically connected to main memory 112C. Processor 111C may be connected to main memory 112C via a bus 113 comprising an address bus, a control bus, and/or a data bus.

Processor 111C comprises a temporary memory 111-1 that stores information about a process in which a page fault occurred. The information stored in temporary memory 111-1 may comprise, e.g., an ID of a process in which a page fault occurred. As another example, information stored in temporary memory 111-1 may comprise request information for reading an ID of a process, in which a page fault occurred, and a page, in which the page fault occurred, from a volatile memory 122B recognized as a swap memory of memory system 120B and for storing the read ID and page in main memory 112C. Because temporary memory 111-1 has been described in detail above with reference to FIG. 1A, repeated descriptions thereof are omitted.

Main memory 112C stores a program Swap API_3 for performing a memory swap operation according to another embodiment of the inventive concept. Main memory 112C may be, for example, DRAM or SRAM.

Memory system 120B comprises a controller 121B and volatile memory 122B. Because memory system 120B has been described above with reference to FIG. 1B, repeated descriptions thereof are omitted in order to avoid redundancy.

Where memory system 120B is connected to host 110C, processor 111C of host 110C recognizes volatile memory 122B of memory system 120B as a swap memory and registers volatile memory 122B as a swap memory in a memory map.

Controller 121B writes data transmitted from host 110C to volatile memory 122B or reads data from volatile memory 122B and then transmit the read data to host 110C, according to a command received from host 110C.

Electronic device 100C may be implemented with a virtual memory system enabling execution of large-scale software by using a limited capacity of main memory 112C.

A memory swap operation of electronic device 100C is described below.

Where a page fault occurs, processor 111C drives the program Swap API_3 stored in main memory 112C. A page fault occurs where a page which processor 111C desires to read to perform an application process is not stored in main memory 112C.

Where a page fault occurs, the following steps 1c to 3c are performed by the program Swap API_3.

In a step 1c, information about a process in which a page fault occurred is written into temporary memory 111-1. For example, an ID of a process in which a page fault occurred may be written into temporary memory 111-1. As another example, request information may be written into temporary memory 111-1, where the request information is information for copying an ID of a process, in which a page fault occurred, and a page, in which the page fault occurred, from volatile memory 122B recognized as a swap memory into main memory 112C.

In a step 2c, an operation for copying a page, in which a page fault occurred, into main memory 112C is performed, where the page in which a page fault occurred is stored in volatile memory 122B recognized as a swap memory, based on DMA. In other words, processor 111C recognizes volatile memory 122B of memory system 120B as a memory. Accordingly, an operation for reading the page, in which a page fault occurred, from volatile memory 122B recognized as a swap memory, based on DMA and then writing the read page into main memory 112C is performed. Due to this, where a page fault occurs, access to a swap memory may be performed first due to DMA.

In step 3c, after completing step 2c, processor 111C resumes a process corresponding to a process ID stored in temporary memory 111-1. For example, after completing step 2c, processor 111C performs a wake-up processing on a process that is directed by a process ID stored in temporary memory 111-1. Accordingly, a process suspended due to the occurrence of a page fault is resumed.

As described above, access to a swap memory may be performed first due to DMA where program Swap API_3 is executed. In addition, after the page in which a page fault occurred is loaded in main memory 112C, processor 111C may immediately resume a process in a sleep state due to the occurrence of a page fault.

Due to this, where program Swap API_3 is used where a page fault occurs, a process execution time may be reduced, compared to when using the program Swap API_1 and the program Swap API_2.

Figure 2A:
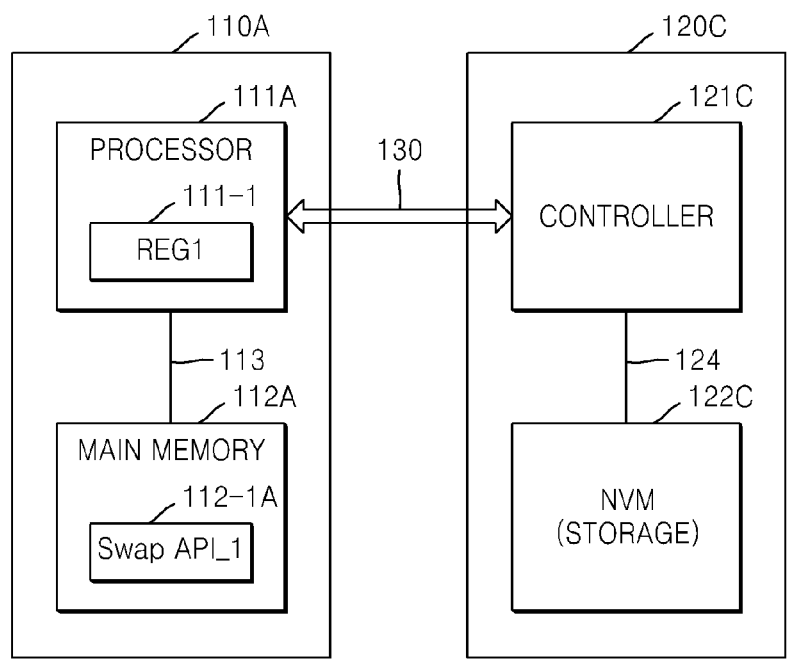
FIG. 2A is a block diagram of an electronic device according to another embodiment of the inventive concept.
Figure 2B:
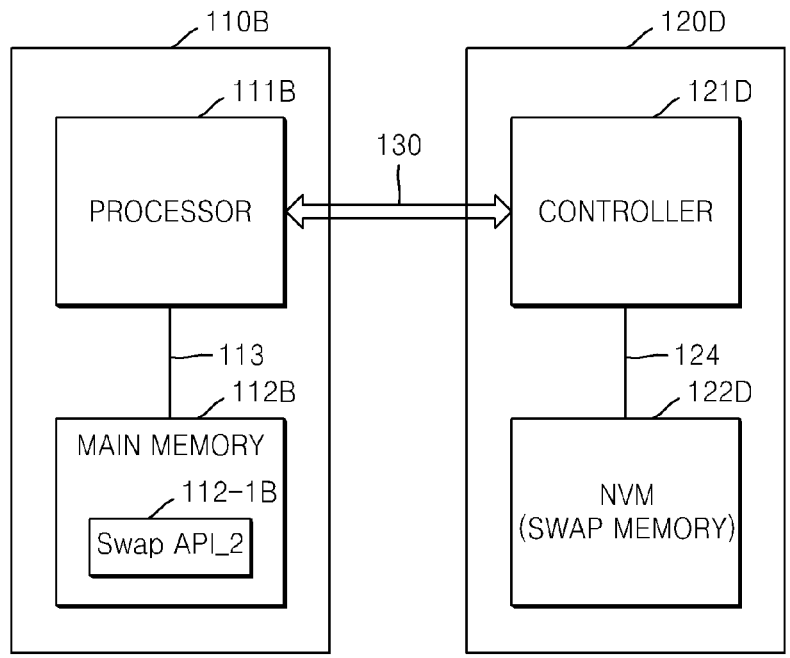
FIG. 2B is a block diagram of an electronic device according to another embodiment of the inventive concept.
Figure 2C:
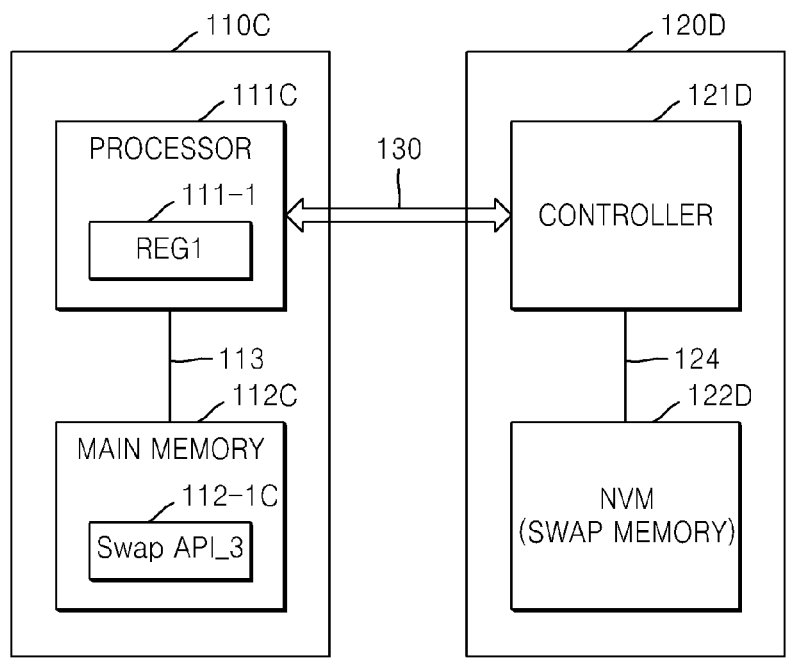
FIG. 2C is a block diagram of an electronic device according to another embodiment of the inventive concept.

FIGS. 2A to 2C are block diagrams of electronic devices 100D to 100F according to embodiments of the inventive concept.

Referring to FIG. 2A, electronic device 100D comprises a host 110A and a memory system 120C. The configuration of host 110A of electronic device 100D is the same as that of host 110A of electronic device 100A illustrated in FIG. 1A, so a repeated description thereof is omitted.

Memory system 120C comprises a controller 121C and a nonvolatile memory 122C. Controller 121C transmits/receives information to/from processor 111A of host 110A via wired or wireless interface 130. Controller 121C is electrically connected to nonvolatile memory 122C via a bus 124 comprising an address bus, a control bus, and/or a data bus.

Nonvolatile memory 122C is recognized as a storage device by processor 111A of host 110A. Even where a power supply is cut off, data stored in nonvolatile memory 122C is not lost. Swap data may be stored in nonvolatile memory 122C. For example, nonvolatile memory 122C may be a flash memory device, phase change RAM (PRAM), ferroelectric RAM (FRAM), magnetic RAM (MRAM), etc.

Controller 121C writes data transmitted from host 110A to nonvolatile memory 122C and reads data from nonvolatile memory 122C and then transmits the read data to host 110A, according to a command received from host 110A.

A memory swap operation of electronic device 100D is described below.

Where a page fault occurs, processor 111A drives a program Swap API_1 stored in a main memory 112A. Accordingly, where a page fault occurs, the following steps 1d to 3d are performed by the program Swap API_1.

In a step 1d, processor 111A writes information about a process, in which a page fault occurred, into temporary memory 111-1. For example, processor 111A may write an ID of a process, in which a page fault occurred, into temporary memory 111-1. As another example, processor 111A may write request information into temporary memory 111-1, where the request information is information for copying an ID of a process, in which a page fault occurred, and a page, in which the page fault occurred, from nonvolatile memory 122C, which is storage of memory system 120C, into main memory 112C.

In a step 2d, electronic device 100D copies a page, in which a page fault occurred, from nonvolatile memory 122C recognized as a storage device into main memory 112C based on a storage access process.

In a step 3d, after completing step 2d, processor 111A resumes a process corresponding to a process ID stored in temporary memory 111-1. For example, where an operation in which the page in which a page fault occurred is loaded in main memory 112C is completed according to step 2d, processor 111A may perform a wake-up process on a process that is directed by a process ID stored in temporary memory 111-1.

Next, electronic device 100E is described with reference to FIG. 2B.

Referring to FIG. 2B, electronic device 100E comprises a host 110B and a memory system 120D.

Because the configuration of host 110B of electronic device 100E is the same as that of host 110B of electronic device 100B illustrated in FIG. 1B, repeated descriptions thereof are omitted. Memory system 120D comprises a controller 121D and a nonvolatile memory 122D.

Controller 121D of memory system 120D receives information from processor 111B of host 110B via wired or wireless interface 130 or may transmit information to processor 111B via the wired or wireless interface 130.

Controller 121D is electrically connected to nonvolatile memory 122D. Controller 121D may be connected to nonvolatile memory 122D via a bus 124 comprising an address bus, a control bus, and/or a data bus. Nonvolatile memory 122D is recognized as a swap memory by processor 111B of host 110B. For example, nonvolatile memory 122D may be a flash memory device, PRAM, FRAM, MRAM, etc.

Where memory system 120D is connected to host 110B, processor 111B of host 110B may recognize nonvolatile memory 122D of memory system 120D as a swap memory and register nonvolatile memory 122D recognized as a swap memory in a memory map.

Controller 121D writes data transmitted from host 110B to nonvolatile memory 122D or reads data from nonvolatile memory 122D and then transmit the data to host 110B, according to a command received from host 110B.

A memory swap operation of electronic device 100E is described below.

Where a page fault occurs, processor 111B drives a program Swap API_2 stored in main memory 112B. Accordingly, where a page fault occurs, the following steps 1e to 2e are performed by the program Swap API_2.

In a step 1e, an operation for copying a page, in which a page fault occurred, into main memory 112B is performed, where the page in which a page fault occurred is stored in nonvolatile memory 122D recognized as a swap memory, based on DMA. In other words, processor 111B recognizes nonvolatile memory 122D of memory system 120D as a memory rather than a storage device. Accordingly, an operation for reading the page, in which a page fault occurred, from nonvolatile memory 122D recognized as a swap memory, based on DMA and then writing the read page into main memory 112B is performed.

In a step 2e, after completing step 1e, processor 111B prepares to resume a process in which a page fault occurred. For example, after the page in which a page fault occurred is stored in main memory 112B according to step 1b, processes in which sleep occurred wait for a wake-up process to be performed based on an order depending on an initially set rule.

Next, electronic device 100F is described with reference to FIG. 2C.

Referring to FIG. 2C, electronic device 100F comprises a host 111C and a memory system 120D.

Because the configuration of host 111C of electronic device 100F is the same as that of host 111C of electronic device 100C illustrated in FIG. 1C and the configuration of memory system 120D of electronic device 100F is the same as that of memory system 120D of FIG. 2B, repeated descriptions thereof are omitted.

A memory swap operation of electronic device 100F is described below.

Where a page fault occurs, a processor 111C drives a program Swap API_3 stored in a main memory 112C. Accordingly, where a page fault occurs, the following steps 1f to 3f are performed by the program Swap API_3.

In a step 1f, information about a process in which a page fault occurred is written into a temporary memory 111-1. For example, an ID of a process in which a page fault occurred may be written into temporary memory 111-1. As another example, request information may be written into temporary memory 111-1, where the request information is information for copying an ID of a process, in which a page fault occurred, and a page, in which the page fault occurred, from nonvolatile memory 122D recognized as a swap memory into main memory 112C.

In a step 2f, an operation for copying a page, in which a page fault occurred, into main memory 112C is performed, where the page in which a page fault occurred is stored in nonvolatile memory 122D recognized as a swap memory, based on DMA. In other words, processor 111C recognizes nonvolatile memory 122D of memory system 120D as a memory rather than a storage device. Accordingly, an operation for reading the page, in which a page fault occurred, from a nonvolatile memory 122D recognized as a swap memory, based on DMA and then writing the read page into main memory 112C is performed.

In a step 3f, after completing step 2f, processor 111C resumes a process corresponding to a process ID stored in temporary memory 111-1. For example, after completing step 2f, processor 111C performs a wake-up processing on a process that is directed by a process ID stored in temporary memory 111-1. Accordingly, a process suspended due to the occurrence of a page fault is resumed.

As described above, access to a swap memory may be performed first due to DMA where the program Swap API_3 is executed. In addition, after the page in which a page fault occurred is loaded in main memory 112C, processor 111C may immediately resume a process in a sleep state due to the occurrence of a page fault.

Figure 3A:
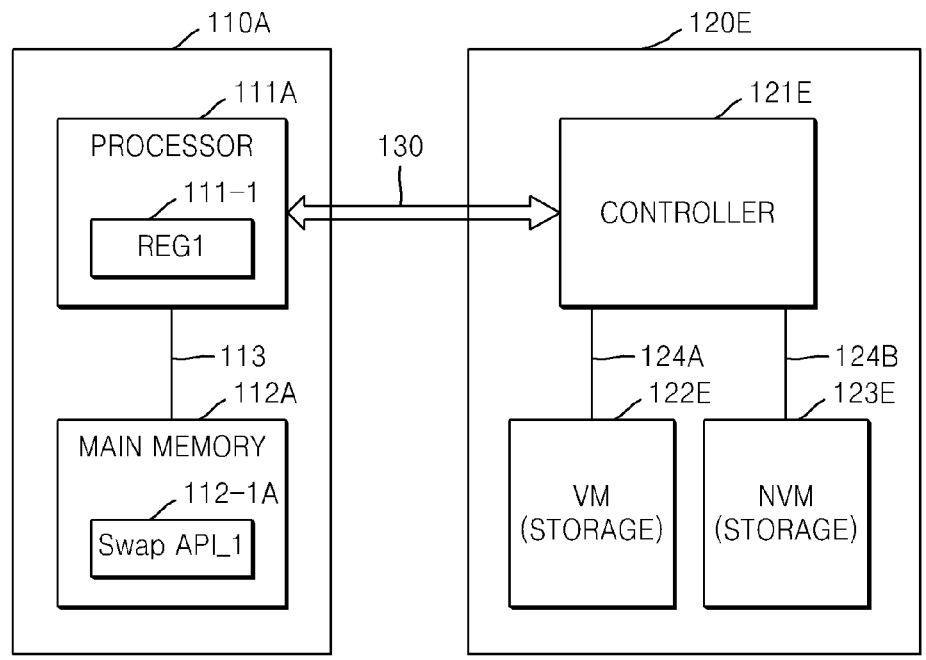
FIG. 3A is a block diagram of an electronic device according to another embodiment of the inventive concept.
Figure 3B:
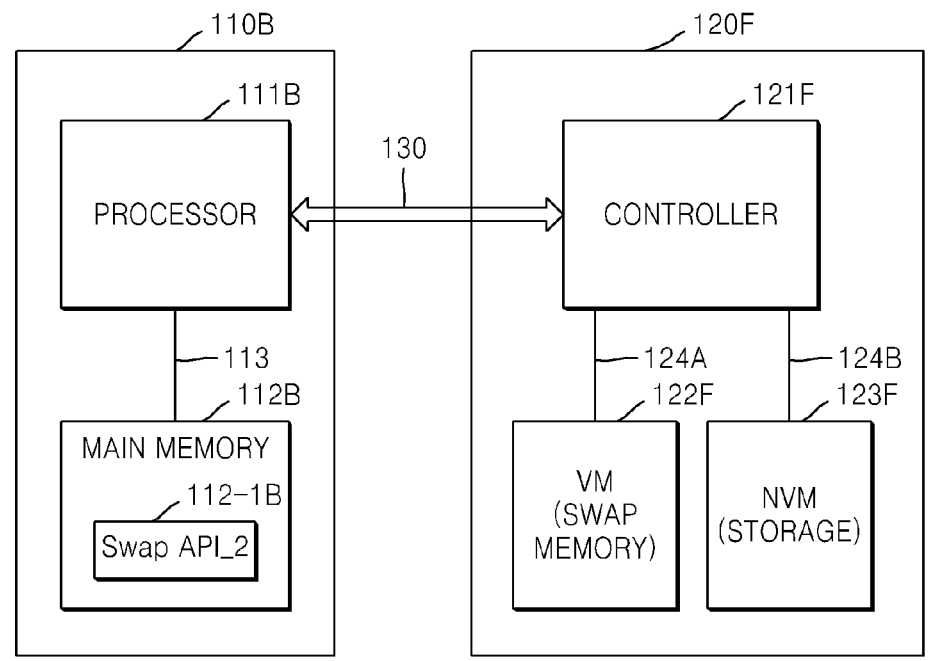
FIG. 3B is a block diagram of an electronic device according to another embodiment of the inventive concept.
Figure 3C:
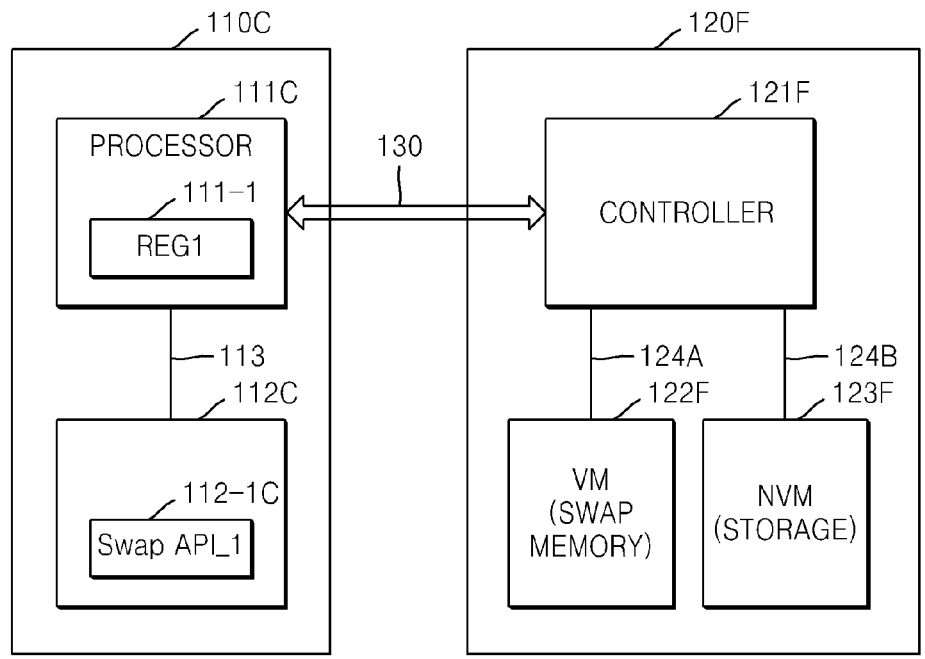
FIG. 3C is a block diagram of an electronic device according to another embodiment of the inventive concept.

FIGS. 3A to 3C are block diagrams of electronic devices 100G to 100I according to other embodiments of the inventive concept.

First, electronic device 100G is described with reference to FIG. 3A.

Referring to FIG. 3A, electronic device 100G comprises a host 110A and a memory system 120E.

Because the configuration of host 110A of electronic device 100G is the same as that of host 110A of electronic device 100A illustrated in FIG. 1A, repeated descriptions thereof are omitted.

Memory system 120E comprises a controller 121E, a volatile memory 122E, and a nonvolatile memory 123E.

Controller 121E of memory system 120E may receive information from a processor 111A of host 110A via wired or wireless interface 130 or may transmit information to processor 111A via the wired or wireless interface 130.

Controller 121E is electrically connected to volatile memory 1 22E and nonvolatile memory 1 23E. Controller 121E may be connected to volatile memory 1 22E and nonvolatile memory 1 23E via a bus 124A and a bus 124B, each of which comprises an address bus, a control bus, and/or a data bus, respectively.

Volatile memory 122E and nonvolatile memory 123E each are recognized as a storage device by processor 111A of host 110A.

Controller 121E may write data transmitted from host 110A to volatile memory 122E or nonvolatile memory 123E or read data from volatile memory 122E or nonvolatile memory 123E and then transmit the read data to host 110A, according to a command received from host 110A.

A memory swap operation of electronic device 100G is described below.

Where a page fault occurs, processor 111A drives a program Swap API_1 stored in main memory 112A. Accordingly, where a page fault occurs, the following steps 1g to 3g are performed by the program Swap API_1.

In a step 1g, information about a process in which a page fault occurred is written into a temporary memory 111-1. For example, an ID of a process in which a page fault occurred may be written into temporary memory 111-1. As another example, request information may be written into temporary memory 111-1, where the request information is information for copying an ID of a process, in which a page fault occurred, and a page, in which the page fault occurred, from volatile memory 122E or nonvolatile memory 123E, which is a storage device of memory system 120E, into main memory 112A.

In a step 2g, an operation for copying a page, in which a page fault occurred, from volatile memory 122E or nonvolatile memory 123E, recognized as a storage device, into main memory 112A is performed based on a storage access process.

In a step 3g, after completing step 2g, processor 111A resumes a process corresponding to a process ID stored in temporary memory 111-1.

Next, electronic device 100H is described with reference to FIG. 3B.

Referring to FIG. 3B, electronic device 100H comprises a host 110B and a memory system 120F.

Because the configuration of host 110B of electronic device 100H is the same as that of host 110B of electronic device 100B illustrated in FIG. 1B, repeated descriptions thereof are omitted.

Memory system 120F comprises a controller 121F, a volatile memory 122F, and a nonvolatile memory 123F.

Controller 121F of memory system 120F may receive information from a processor 111B of host 110B via wired or wireless interface 130 or may transmit information to processor 111B via the wired or wireless interface 130.

Controller 121F is electrically connected to volatile memory 122F and nonvolatile memory 123F. Controller 121F may be connected to volatile memory 122F and nonvolatile memory 123F via a bus 124A and a bus 124B, each of which comprises an address bus, a control bus, and/or a data bus, respectively.

Volatile memory 122F is recognized as a swap memory by processor 111B of host 110B, and nonvolatile memory 123F is recognized as a storage device by processor 111B.

Where memory system 120F is connected to host 110B, processor 111B of host 110B may recognize volatile memory 122F of memory system 120F as a swap memory and may register volatile memory 122F as a swap memory in a memory map. Also, processor 111B may register nonvolatile memory 123F as a storage device in the memory map.

Controller 121F may write data transmitted from host 110B to volatile memory 122F or nonvolatile memory 123F or read data from volatile memory 122F or nonvolatile memory 123F and then transmit the read data to host 110B, according to a command received from host 110B.

A memory swap operation of electronic device 100H is described below.

Where a page fault occurs, processor 111B drives a program Swap API_2 stored in a main memory 112B. Accordingly, where a page fault occurs, the following steps 1h to 2h are performed by the program Swap API_2.

In a step 1h, an operation for copying a page, in which a page fault occurred, into main memory 112B is performed, where the page in which a page fault occurred is stored in volatile memory 122F recognized as a swap memory, based on DMA. In other words, processor 111B recognizes volatile memory 122F of memory system 120F as a memory rather than a storage device. Accordingly, an operation for reading the page, in which a page fault occurred, from volatile memory 122F recognized as a swap memory, based on DMA and then writing the read page into main memory 112B is performed. Due to this, where a page fault occurs, access to a swap memory may be performed first due to DMA.

In a step 2h, after completing step 1h, processor 111B prepares to resume a process in which a page fault occurred. For example, after the page in which a page fault occurred is stored in main memory 112B according to step 1h, processes in which sleep occurred wait for a wake-up process to be performed based on an order depending on an initially set rule.

Next, electronic device 100I is described with reference to FIG. 3C.

Referring to FIG. 3C, electronic device 100I comprises a host 110C and a memory system 120F.

Because the configuration of host 110C of electronic device 100I is the same as that of host 110C of electronic device 100C illustrated in FIG. 1C and the configuration of memory system 120F of electronic device 100I is the same as that of memory system 120F of FIG. 3B, repeated descriptions thereof are omitted.

A memory swap operation of electronic device 100I is described below.

Where a page fault occurs, processor 111C drives a program Swap API_3 stored in a main memory 112C. Accordingly, where a page fault occurs, the following steps 1i to 3i are performed by the program Swap API_3.

In a step 1i, information about a process in which a page fault occurred is written into a temporary memory 111-1. For example, an ID of a process in which a page fault occurred may be written into temporary memory 111-1. As another example, request information may be stored in temporary memory 111-1, where the request information is information for copying an ID of a process, in which a page fault occurred, and a page, in which the page fault occurred, from a volatile memory 122F recognized as a swap memory into main memory 112C.

In a step 2i, an operation for copying a page, in which a page fault occurred, into main memory 112C is performed, where the page in which a page fault occurred is stored in volatile memory 122F recognized as a swap memory, based on DMA. In other words, processor 111C recognizes volatile memory 122F of memory system 120F as a memory rather than a storage device. Accordingly, an operation for reading the page, in which a page fault occurred, from volatile memory 122F recognized as a swap memory, based on DMA and then writing the read page into main memory 112C is performed.

In a step 3i, after completing step 2i, processor 111C resumes a process corresponding to a process ID stored in temporary memory 111-1.

Figure 4A:
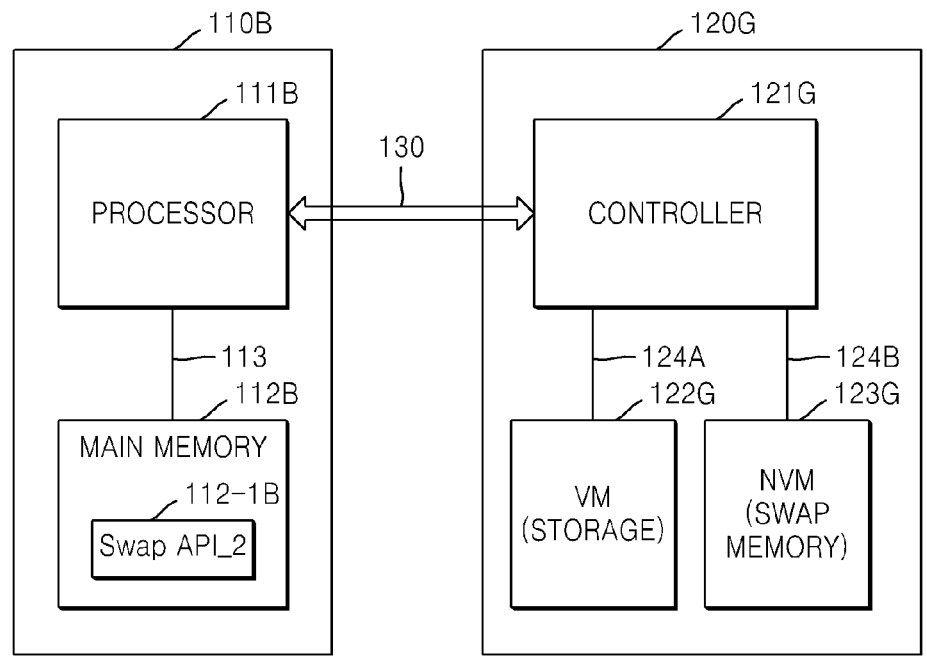
FIG. 4A is a block diagram of an electronic device according to another embodiment of the inventive concept.
Figure 4B:
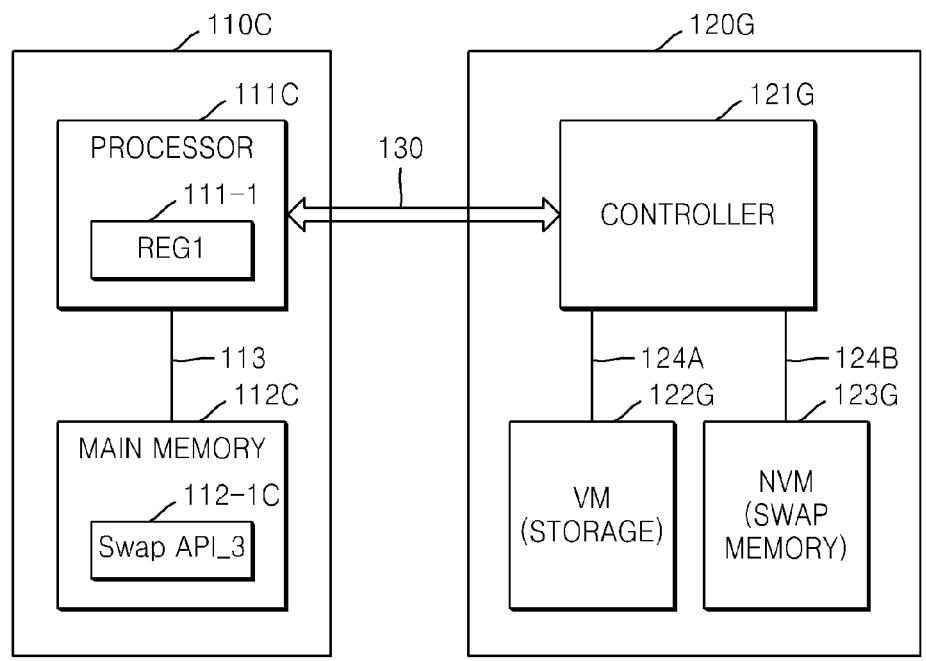
FIG. 4B is a block diagram of an electronic device according to another embodiment of the inventive concept.

FIGS. 4A and 4B are block diagrams of electronic devices 100J and 100K according to other embodiments of the inventive concept.

Electronic device 100J is described with reference to FIG. 4A.

Referring to FIG. 4A, electronic device 100J comprises a host 110B and a memory system 120G.

Because the configuration of host 110B of electronic device 100J is the same as that of host 110B of electronic device 100B illustrated in FIG. 1B, repeated descriptions thereof are omitted.

Memory system 120G comprises a controller 121G, a volatile memory 122G, and a nonvolatile memory 123G.

Controller 121G of memory system 120G may receive information from a processor 111B of host 110B via wired or wireless interface 130 or may transmit information to processor 111B via the wired or wireless interface 130.

Controller 121G is electrically connected to volatile memory 122G and nonvolatile memory 123G. Controller 121G may be connected to volatile memory 122G and nonvolatile memory 123G via a bus 124A and a bus 124B, each of which comprises an address bus, a control bus, and/or a data bus, respectively.

Nonvolatile memory 123G is recognized as a swap memory by processor 111B of host 110B, and volatile memory 122G is recognized as a storage device by processor 111B.

Where memory system 120G is connected to host 110B, processor 111B of host 110B may recognize nonvolatile memory 123G of memory system 120G as a swap memory and may register nonvolatile memory 123G as a swap memory in a memory map. Also, processor 111B may register volatile memory 122G as a storage device in the memory map.

Controller 121G may write data transmitted from host 110B to volatile memory 122G or nonvolatile memory 123G or read data from volatile memory 122G or nonvolatile memory 123G and then transmit the read data to host 110B, according to a command received from host 110B.

A memory swap operation of electronic device 100J is described below.

Where a page fault occurs, processor 111B drives a program Swap API_2 stored in a main memory 112B. Accordingly, where a page fault occurs, the following steps 1j to 2j are performed by the program Swap API_2.

In a step 1j, an operation for copying a page, in which a page fault occurred, into main memory 112B is performed, where the page in which a page fault occurred is stored in nonvolatile memory 123G recognized as a swap memory, based on DMA. In other words, processor 111B recognizes nonvolatile memory 123G of memory system 120G as a memory rather than a storage device. Accordingly, an operation for reading the page, in which a page fault occurred, from nonvolatile memory 123G recognized as a swap memory, based on DMA and then writing the read page into main memory 112B is performed.

In a step 2j, after completing step 1j, processor 111B prepares to resume a process in which a page fault occurred. For example, after the page in which a page fault occurred is stored in main memory 112B according to step 1j, processes in which sleep occurred wait for a wake-up process to be performed based on an order depending on an initially set rule.

Electronic device 100K is described with reference to FIG. 4B.

Referring to FIG. 4B, electronic device 100K comprises a host 110C and a memory system 120G.

Because the configuration of host 110C of electronic device 100K is the same as that of host 110C of electronic device 100C illustrated in FIG. 1C and the configuration of memory system 120G of electronic device 100K is the same as that of memory system 120G of FIG. 4A, repeated descriptions thereof are omitted.

A memory swap operation of electronic device 100K is described below.

Where a page fault occurs, a processor 111C drives a program Swap API_3 stored in a main memory 112C. Accordingly, where a page fault occurs, the following steps 1k to 3k are performed by the program Swap API_3.

In a step 1k, information about a process in which a page fault occurred is written into a temporary memory 111-1. For example, an ID of a process in which a page fault occurred may be written into temporary memory 111-1. As another example, request information may be written into temporary memory 111-1, where the request information is information for copying an ID of a process, in which a page fault occurred, and a page, in which the page fault occurred, from a nonvolatile memory 123G recognized as a swap memory into main memory 112C.

In a step 2k, an operation for copying a page, in which a page fault occurred, into main memory 112C is performed, where the page in which a page fault occurred is stored in a volatile memory 122G recognized as a swap memory, based on DMA. In other words, processor 111C recognizes nonvolatile memory 123G of memory system 120G as a memory rather than a storage device. Accordingly, an operation for reading the page, in which a page fault occurred, from nonvolatile memory 123G recognized as a swap memory, based on DMA and then writing the read page into main memory 112C is performed.

In a step 3k, after completing step 2k, processor 111C resumes a process corresponding to a process ID stored in temporary memory 111-1.

Figure 5A:
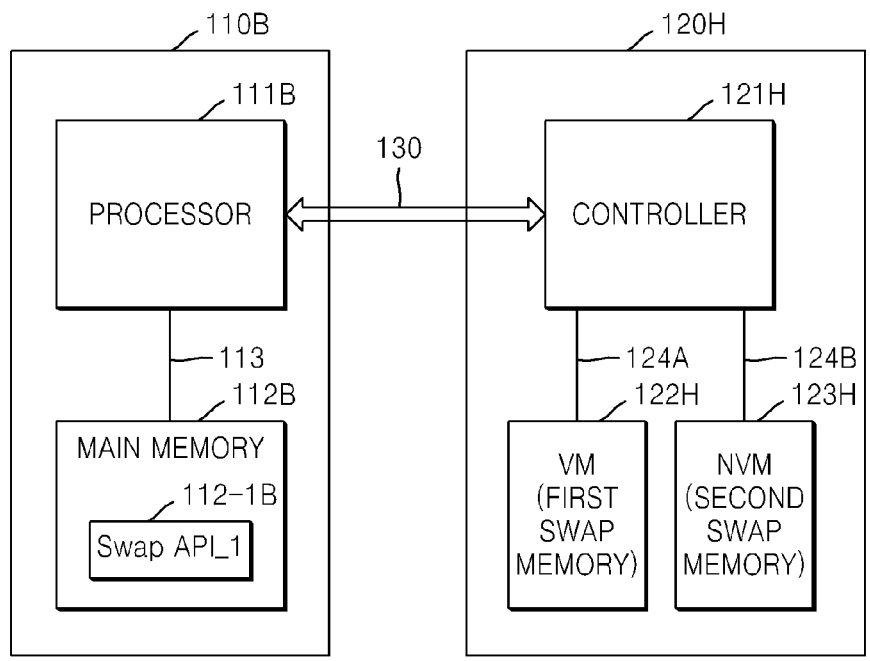
FIG. 5A is a block diagram of an electronic device according to another embodiment of the inventive concept.
Figure 5B:
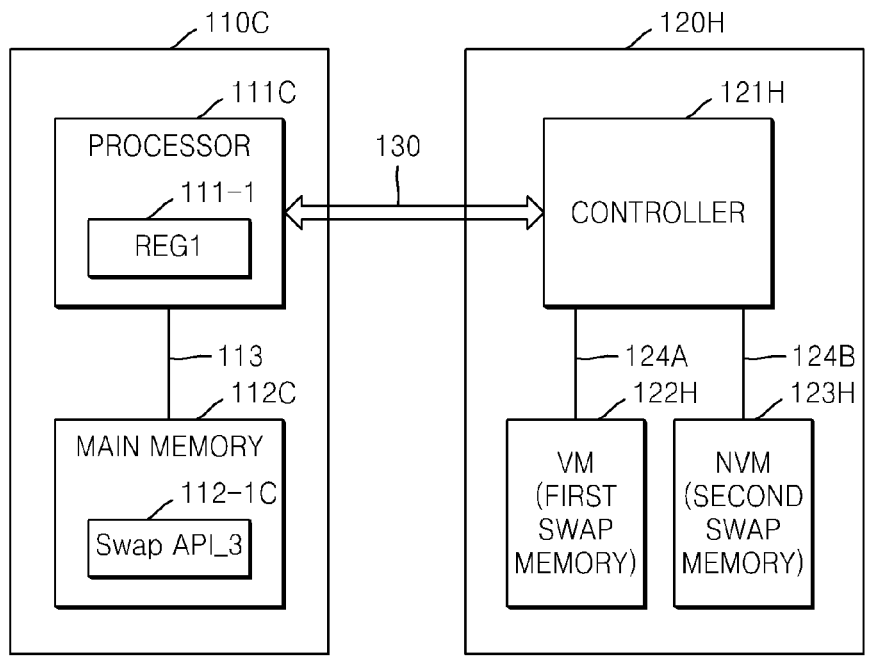
FIG. 5B is a block diagram of an electronic device according to another embodiment of the inventive concept.

FIGS. 5A and 5B are block diagrams of electronic devices 100L and 100M according to other embodiments of the inventive concept.

First, electronic device 100L is described with reference to FIG. 5A.

Referring to FIG. 5A, electronic device 100L comprises a host 110B and a memory system 120H.

Because the configuration of host 110B of electronic device 100L is the same as that of host 110B of electronic device 100B illustrated in FIG. 1B, repeated descriptions thereof are omitted.

Memory system 120H comprises a controller 121H, a volatile memory 122H, and a nonvolatile memory 123H.

Controller 121H of memory system 120H may receive information from a processor 111B of host 110B via wired or wireless interface 130 or may transmit information to processor 111B via the wired or wireless interface 130.

Controller 121H is electrically connected to volatile memory 122H and nonvolatile memory 123H. Controller 121H may be connected to volatile memory 122H and nonvolatile memory 123H via a bus 124A and a bus 124B, each of which comprises an address bus, a control bus, and/or a data bus, respectively.

Volatile memory 122H and nonvolatile memory 123H are each recognized as a swap memory by processor 111B of host 110B.

Where memory system 120H is connected to host 110B, processor 111B of host 110B may recognize each of volatile memory 122H and nonvolatile memory 123H of memory system 120H as a swap memory and may register each of volatile memory 122H and nonvolatile memory 123H as a swap memory in a memory map.

controller 121H may write data transmitted from host 110B to volatile memory 122H or nonvolatile memory 123H or read data from volatile memory 122H or nonvolatile memory 123H and then transmit the read data to host 110B, according to a command received from host 110B.

A memory swap operation of electronic device 100L is described below.

Where a page fault occurs, processor 111B drives a program Swap API_2 stored in a main memory 112B. Accordingly, where a page fault occurs, the following steps 1l to 2l are performed by the program Swap API_2.

In a step 1l, an operation for copying a page, in which a page fault occurred, into main memory 112B is performed, where the page in which a page fault occurred is stored in volatile memory 122H or nonvolatile memory 123H recognized as a swap memory, based on DMA. In other words, processor 111B recognizes each of volatile memory 122H and nonvolatile memory 123H of memory system 120H as a memory rather than a storage device. Accordingly, an operation for reading the page, in which a page fault occurred, from volatile memory 122H or nonvolatile memory 123H recognized as a swap memory, based on DMA and then writing the read page into main memory 112B is performed.

In a step 2l, after completing step 1l, processor 111B prepares to resume a process in which a page fault occurred. For example, after the page in which a page fault occurred is stored in main memory 112B according to step 1l, processes in which sleep occurred waits for a wake-up process to be performed based on an order depending on an initially set rule.

Next, electronic device 100M is described with reference to FIG. 5B.

Referring to FIG. 5B, electronic device 100M comprises a host 110C and a memory system 120H.

Because the configuration of host 110C of electronic device 100M is the same as that of host 110C of electronic device 100C illustrated in FIG. 1C and the configuration of memory system 120H of electronic device 100M is the same as that of memory system 120G of FIG. 5A, repeated descriptions thereof are omitted.

A memory swap operation of electronic device 100M is described below.

Where a page fault occurs, processor 111C drives a program Swap API_3 stored in a main memory 112C.

Accordingly, where a page fault occurs, the following steps 1*m* to 3*m* are performed by the program Swap API_3.

In a step 1*m*, information about a process in which a page fault occurred is written into a temporary memory 111-1. For example, an ID of a process in which a page fault occurred may be written into temporary memory 111-1. As another example, request information may be written into temporary memory 111-1, where the request information is information for copying an ID of a process, in which a page fault occurred, and a page, in which the page fault occurred, from a volatile memory 122H or a nonvolatile memory 123H recognized as a swap memory into main memory 112C.

In a step 2*m*, an operation for copying a page, in which a page fault occurred, into main memory 112C is performed, where the page in which a page fault occurred is stored in volatile memory 122H recognized as a swap memory, based on DMA. In other words, processor 111C recognizes each of volatile memory 122H and nonvolatile memory 123H of memory system 120H as a memory rather than a storage device. Accordingly, an operation for reading the page, in which a page fault occurred, from volatile memory 122H or nonvolatile memory 123H recognized as a swap memory, based on DMA and then writing the read page into main memory 112C is performed.

In a step 3*m*, after completing step 2*m*, processor 111C resumes a process corresponding to a process ID stored in temporary memory 111-1.

Figure 6A:
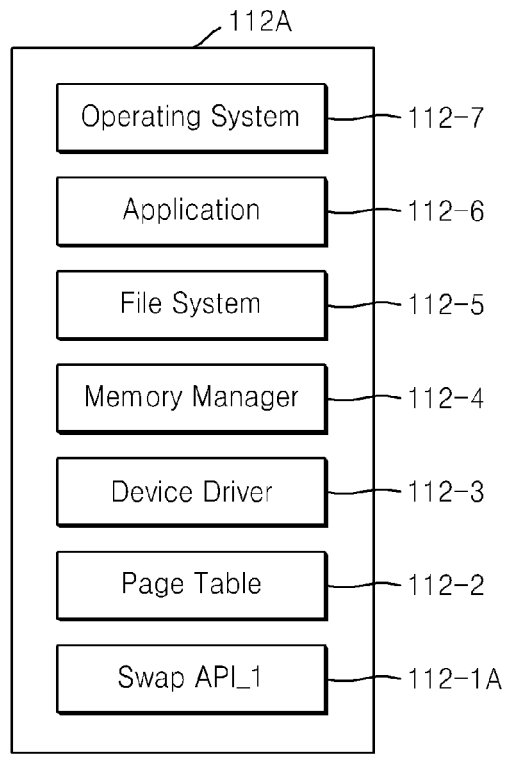
FIG. 6A is a diagram showing programs and data stored in a main memory illustrated in FIGS. 1A, 2A, and 3A.

FIG. 6A is a diagram showing programs and data stored in main memory 112A illustrated in FIGS. 1A, 2A, and 3A.

Referring to FIG. 6A, main memory 112A may store a program (Swap API_D 112-1A, a page table 112-2, a device driver 112-3, a memory manager 112-4, a file system 112-5, an application 112-6, and an operating system 112-7.

Operating system 112-7 is a program for controlling hardware and software resources of host 110A. Operating system 112-7 functions as an interface between hardware and an application program and manages resources of host 110A.

Application 112-6 comprises various application programs that are executed in host 110A. For example, application 112-6 may comprise programs that support an operation for processing files or data.

File system 112-5 is a program that manages logical storage locations to store files or data in main memory 112A of host 110A or a memory system connected to host 110A or to search for files or data.

Memory manager 112-4 is a program that controls a memory access operation, which is performed in main memory 112A, or a memory access operation which is performed in the memory system connected to host 110A.

Device driver 112-3 is a program that supports communication with the memory system connected to host 110A.

Page table 112-2 stores page lists for information stored in main memory 112A and the memory system connected to host 110A. For example, the page lists may comprise information about physical page addresses corresponding to logical page addresses. Based on the physical page addresses stored in page table 112-2, it may be determined whether information to be accessed is stored in main memory 122A or the memory system connected to host 110A. Memory map information may be included in page table 112-2. As another example, the memory map information may be separate from page table 112-2, the memory map information and page table 112-2 may be separately stored.

The program (Swap API_D 112-1A is an example of a program for performing a memory swap operation as described above where a page fault occurs.

Figure 6B:
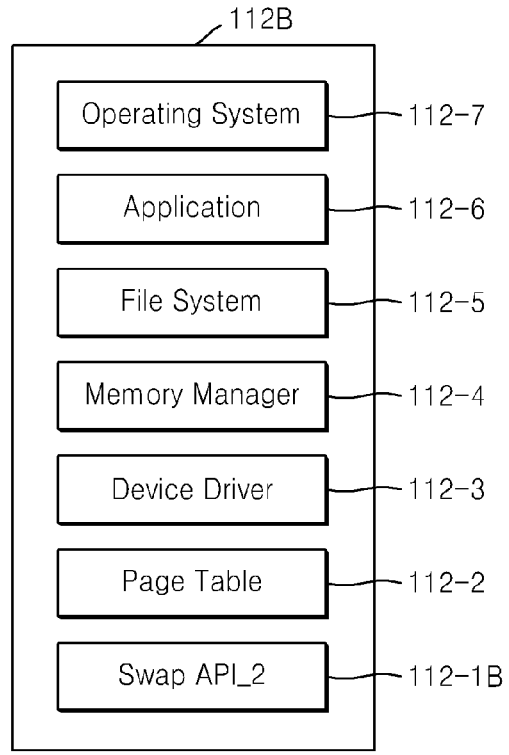
FIG. 6B is a diagram showing programs and data stored in a main memory illustrated in FIGS. 1B, 2B, 3B, 4A, and 5A.

FIG. 6B is a diagram showing programs and data stored in main memory 112B illustrated in FIGS. 1B, 2B, 3B, 4A, and 5A.

Referring to FIG. 6B, main memory 112B may store a program (Swap API_2) 112-1B, a page table 112-2, a device driver 112-3, a memory manager 112-4, a file system 112-5, an application 112-6, and an operating system 112-7.

Page table 112-2, device driver 112-3, memory manager 112-4, file system 112-5, application 112-6, and operating system 112-7 of FIG. 6B are the same as page table 112-2, device driver 112-3, memory manager 112-4, file system 112-5, application 112-6, and operating system 112-7 of FIG. 6A, respectively, and thus, repeated descriptions thereof are omitted. The program Swap (API_2) 112-1B is another example of a program for performing a memory swap operation as described above where a page fault occurs.

Figure 6C:
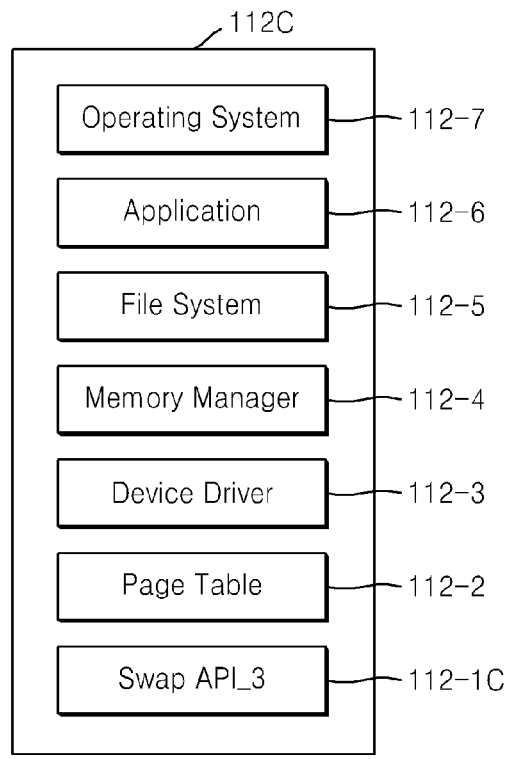
FIG. 6C is a diagram showing programs and data stored in a main memory illustrated in FIGS. 1C, 2C, 3C, 4B, and 5B.

FIG. 6C is a diagram showing programs and data stored in main memory 112C illustrated in FIGS. 1C, 2C, 3C, 4B, and 5B.

Referring to FIG. 6C, main memory 112C may store a program (Swap API_3) 112-1C, a page table 112-2, a device driver 112-3, a memory manager 112-4, a file system 112-5, an application 112-6, and an operating system 112-7.

Page table 112-2, device driver 112-3, memory manager 112-4, file system 112-5, application 112-6, and operating system 112-7 of FIG. 6C are the same as page table 112-2, device driver 112-3, memory manager 112-4, file system 112-5, application 112-6, and operating system 112-7 of FIG. 6A, respectively, and thus, repeated descriptions thereof are omitted. The program (Swap API_3) 112-1C is another example of a program for performing a memory swap operation as described above where a page fault occurs.

Figure 7:
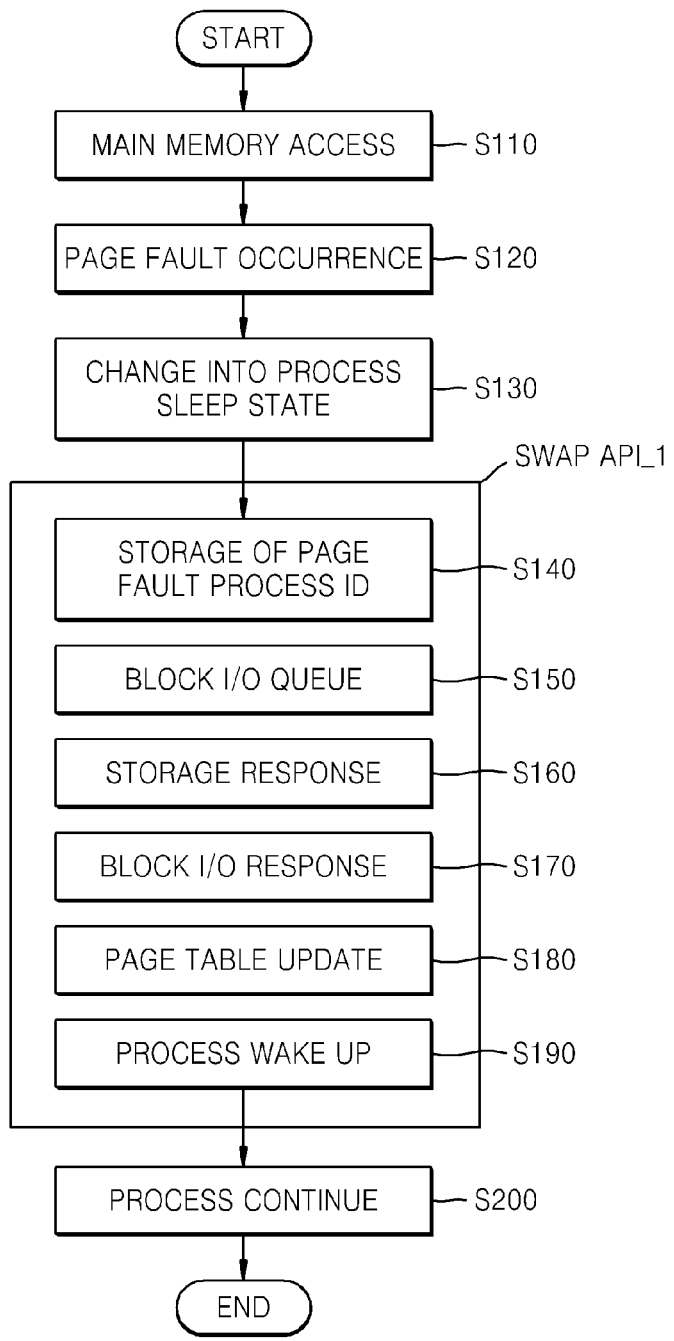
FIG. 7 is a flowchart illustrating a method of executing a memory swap operation based on a program Swap API_1, according to an embodiment of the inventive concept.

FIG. 7 is a flowchart illustrating a method of executing a memory swap operation based on the program Swap API_1, according to an embodiment of the inventive concept.

For example, the memory swap operation based on the program Swap API_1 may be executed in electronic devices 100A, 100D, and 100G illustrated in FIGS. 1A, 2A, and 3A, respectively.

Processor 111A accesses main memory 112A to perform an application process based on user interface information (S110). For example, the access to main memory 112A may be performed by using page table 112-2 and file system 112-5.

Where a page fault occurs in the process of accessing main memory 112A (S120), processor 111A changes the state of an application process, in which the page fault occurred, into a sleep state (S130). The page fault occurs where a page to be read to perform an application process is not stored in main memory 112A. For example, processor 111A may change the state of an application process, in which a page fault occurred in an operating system, into a sleep state.

Processor 111A stores information about a process, in which a page fault occurred, into temporary memory 111-1 (S140). For example, processor 111A may store an ID of a process, in which a page fault occurred, in temporary memory 111-1. As another example, processor 111A may store request information in temporary memory 111-1, where the request information is information for storing an ID of a process, in which a page fault occurred, and a page, in which the page fault occurred, in main memory 112A.

Next, processor 111A performs a block input/output (I/O) queuing process (S150). For example, processor 111A performs a block I/O queuing process to make a read request for reading a page, in which a page fault occurred, for each block from a storage device of a memory system connected to host 110A.

Next, the memory system responds as a storage device according to the read request based on the block I/O queuing process (S160). In detail, the memory system performs a process of reading a page in which a page fault occurred, according to the read request based on the block I/O queuing process.

Next, the memory system performs a block I/O response process (S170). In detail, the memory system performs a process of outputting the read page, in which a page fault occurred, to host 110A for each block. Then, processor 111A of host 110A stores the received page, in which a page fault occurred, in main memory 112A.

Next, processor 111A performs a page table update process (S180). That is, after storing the page, in which a page fault occurred, in main memory 112A, processor 111A maps a logical page address for the page to a physical page address.

Next, processor 111A performs a wake-up process on a process that is directed by a process ID stored in temporary memory 111-1 (S190). For example, the wake-up process may be performed in an operating system.

Next, processor 111A executes the process on which the wake-up process was performed (S200). Accordingly, after the page, in which a page fault occurred, is stored in main memory 112A, a process suspended by the page fault may be immediately resumed.

Operations S140 to S190 may be programmed so as to be performed by the program Swap API_1.

Figure 8:
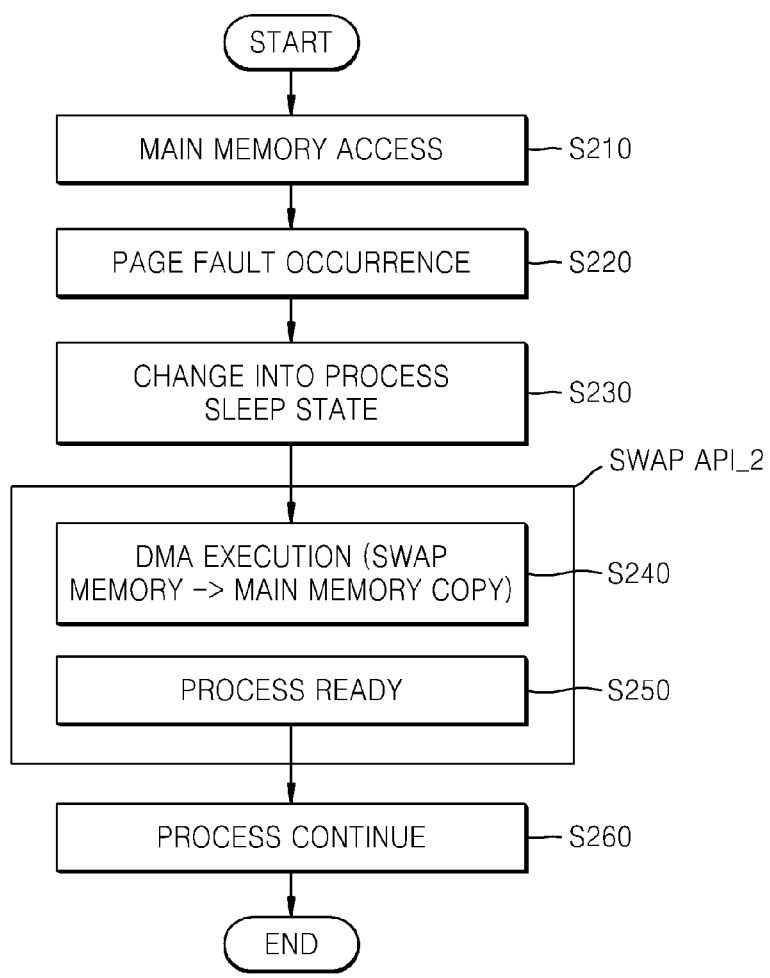
FIG. 8 is a flowchart illustrating a method of executing a memory swap operation based on a program Swap API_2, according to another embodiment of the inventive concept.

FIG. 8 is a flowchart illustrating a method of executing a memory swap operation based on the program Swap API_2, according to another embodiment of the inventive concept.

For example, the memory swap operation based on the program Swap API_2 may be executed in electronic devices 100B, 100E, 100H, 100J, and 100L illustrated in FIGS. 1B, 2B, 3B, 4A, and 5A, respectively.

Processor 111B accesses main memory 112B to perform an application process based on user interface information (S210).

Where a page fault occurs in the process of accessing main memory 112B (S220), processor 111B changes the state of an application process, in which the page fault occurred, into a sleep state (S230). The page fault occurs where a page to be read to perform an application process is not stored in main memory 112B.

Processor 111B copies a page, in which a page fault occurred, into main memory 112B, where the page in which a page fault occurred is stored in a swap memory of the memory system connected to host 110B, based on DMA (S240). That is, the swap memory of the memory system is not accessed by a storage access process but by a DMA process. Due to this, where a page fault occurs, access to the swap memory may be performed first due to DMA.

Next, processor 111B prepares to resume a process in which a page fault occurred (S250). For example, after the page in which a page fault occurred is stored in main memory 112B, processes in which sleep occurred wait for a wake-up process to be performed based on an order depending on an initially set rule.

Where a wake-up process for the process in which a page fault occurred is performed, processor 111B resumes a process suspended by the page fault (S260).

Operations S240 and S250 may be programmed so as to be performed by the program Swap API_2.

Figure 9:
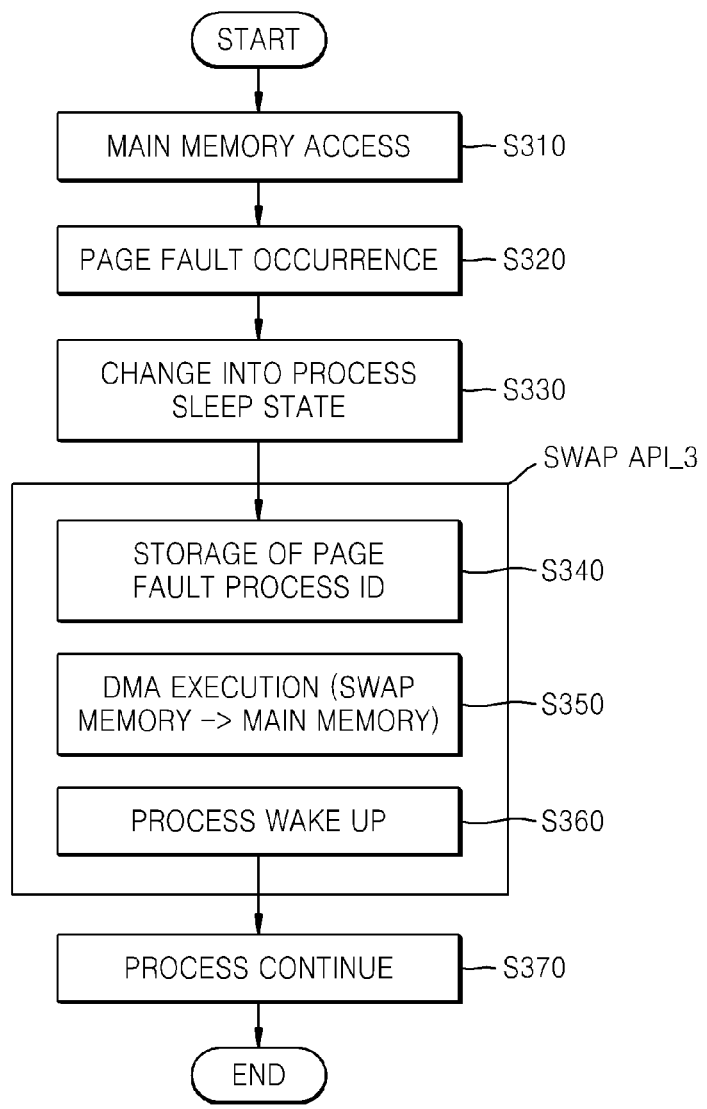
FIG. 9 is a flowchart illustrating a method of executing a memory swap operation based on a program Swap API_3, according to another embodiment of the inventive concept.

FIG. 9 is a flowchart illustrating a method of executing a memory swap operation based on the program Swap API_3, according to another embodiment of the inventive concept.

For example, the memory swap operation based on the program Swap API_3 may be executed in electronic devices 100C, 100F, 100I, 100K, and 100M illustrated in FIGS. 1C, 2C, 3C, 4B, and 5B, respectively.

Processor 111C accesses main memory 112C to perform an application process based on user interface information (S310).

Where a page fault occurs in the process of accessing main memory 112C (S320), processor 111C changes the state of an application process, in which the page fault occurred, into a sleep state (S330). The page fault occurs where a page to be read to perform an application process is not stored in main memory 112C.

Processor 111C writes information about a process, in which a page fault occurred, into temporary memory 111-1 (S340). For example, processor 111C may write an ID of a process, in which a page fault occurred, into temporary memory 111-1. As another example, processor 111A may write request information into temporary memory 111-1, where the request information is information for writing an ID of a process, in which a page fault occurred, and a page, in which the page fault occurred, into main memory 112C.

Next, processor 111C copies a page, in which a page fault occurred, into main memory 112C, where the page in which a page fault occurred is stored in a swap memory of the memory system connected to host 110C, based on DMA (S350). That is, the swap memory of the memory system is not accessed by a storage access process but by a DMA process. Due to this, where a page fault occurs, access to the swap memory may be performed first due to DMA.

Next, processor 111C performs a wake-up process on a process that is directed by a process ID stored in temporary memory 111-1 (S360). After completing an operation for a request for storing a page, in which a page fault occurred, in main memory 112C, processor 111C immediately performs a wake-up process on a process that is directed by a process ID stored in temporary memory 111-1.

Next, processor 111C executes the process on which the wake-up process was performed (S370). Accordingly, after the page, in which a page fault occurred, is stored in main memory 112C, a process suspended by the page fault may be immediately resumed.

Operations S340 to S360 may be programmed so as to be performed by the program Swap API_3.

Figure 10:
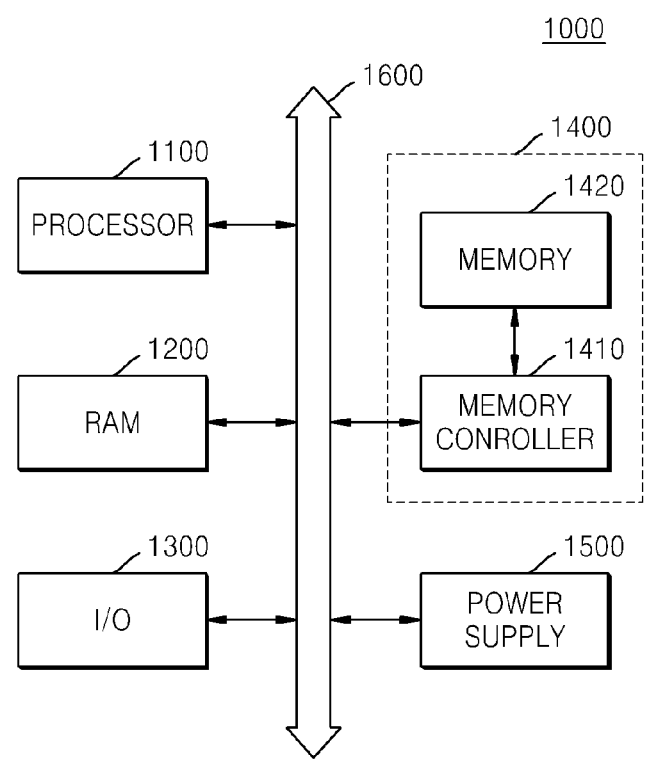
FIG. 10 is a block diagram of a data processing system using a memory swap operation control method based on the programs Swap API_1, Swap API_2, and Swap API_3, according to an embodiment of the inventive concept.

FIG. 10 is a block diagram of a data processing system 1000 using a memory swap operation control method based on the programs Swap API_1, Swap API_2, and Swap API_3, according to an embodiment of the inventive concept.

Referring to FIG. 10, data processing system 1000 may comprise a processor 1100, RAM 1200, an I/O device 1300, a memory system 1400, a power supply 1500, and a bus 1600.

Although not shown in FIG. 10, data processing system 1000 may further comprise ports for communicating with a video card, a sound card, a memory card, and a USB device, or with other electronic devices. Data processing system 1000 may be a personal computer or may be a portable electronic device, such as a notebook computer, a mobile phone, a personal digital assistant (PDA), or a camera.

At least one of processors 111A, 111B, and 111C illustrated in FIGS. 1 to 5 may be applied to processor 1100 illustrated in FIG. 10, and at least one of main memories 112A, 112B, and 112C illustrated in FIGS. 1 to 5 may be applied to RAM 1200 illustrated in FIG. 10. In addition, at least one of memory systems 120A to 120H illustrated in FIGS. 1 to 5 may be applied to memory system 1400 illustrated in FIG. 10.

Processor 1100 may perform specific calculations or tasks. According to an embodiment, processor 1100 may be a microprocessor or a CPU. Processor 1100 may communicate with RAM 1200, the I/O device 1300, and memory system 1400 via bus 1600, such as an address bus, a control bus, or a data bus. According to an embodiment, processor 1100 may also be connected to an extended bus, such as a peripheral component interconnect (PCI) bus. Processor 1100 may perform a memory swap operation according to one of the methods described with reference to FIGS. 7 to 9.

RAM 1200 may store programs and data that are required to operate data processing system 1000. RAM 1200 operates as a main memory. For example, the programs and data described with reference to FIGS. 6A to 6C may be stored in RAM 1200. For example, RAM 1200 may be DRAM, mobile DRAM, SRAM, PRAM, FRAM, RRAM and/or MRAM.

For example, a memory 1420 of memory system 1400 may be a volatile memory or a nonvolatile memory. As another example, memory 1420 may comprise one or more volatile memory and one or more nonvolatile memory.

The I/O device 1300 may comprise an input unit, such as a keyboard, a keypad, or mouse, and an output unit, such as a printer or a display. Power supply 1500 may supply an operating voltage required for the operation of data processing system 1000.

Memory swap operation control methods according to embodiments of the inventive concept, which are performed in data processing system 1000 of FIG. 10, are described with reference to the flowcharts of FIGS. 11 to 14.

Figure 11:
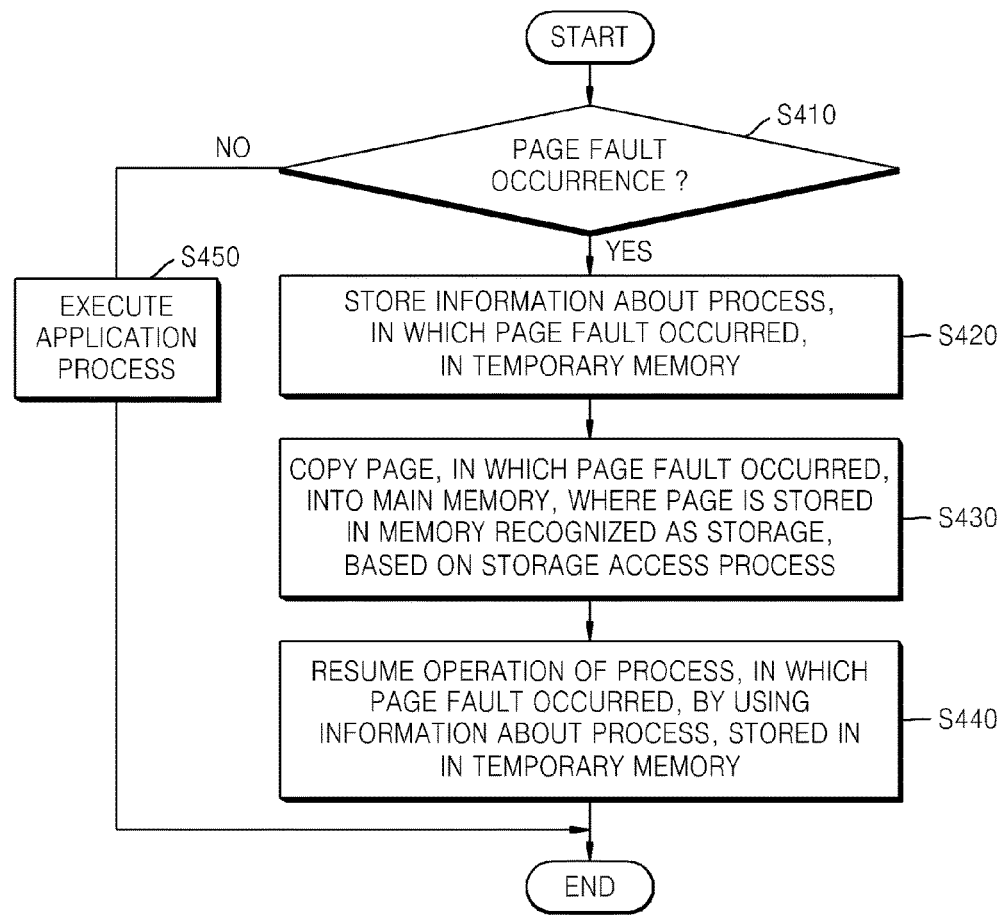
FIG. 11 is a flowchart illustrating a memory swap operation control method according to an embodiment of the inventive concept.

First, a memory swap operation control method, according to an embodiment of the inventive concept, is described with reference to the flowchart of FIG. 11.

Processor 1100 determines whether a page fault occurs in the process of performing process access (S410). Processor 1100 determines whether a page fault occurs in the process of performing access to RAM 1200, which is a main memory, to perform an application process based on user interface information that is received via the I/O device 1300. The page fault occurs where a page to be read to perform an application process is not stored in RAM 1200. The state of a process for a page in which a page fault occurs is changed into a sleep state.

Where a page fault occurs, processor 1100 writes information about a process, in which a page fault occurred, into a temporary memory (S420). For example, although not illustrated in FIG. 10, the temporary memory may be an internal register of processor 1100. As another example, a storage area for the temporary memory may be allocated to a specific area of RAM 1200. The information about a process, in which a page fault occurred, may comprise an ID of a process in which the page fault occurred. Also, the information about a process in which a page fault occurred may comprise request information for storing an ID of the process, in which the page fault occurred, and a page, in which the page fault occurred, in RAM 1200.

Next, processor 1100 copies a page, in which a page fault occurred, into RAM 1200, where the page in which a page fault occurred is stored in memory 1420 of memory system 1400, which is recognized as a storage device, based on a storage access process (S430). RAM 1200 is a main memory of data processing system 1000. In detail, processor 1100 reads a page, in which a page fault occurred, from memory 1420 of memory system 1400, which is recognized as a storage device, based on a storage access process and for writing the read page, in which a page fault occurred, into RAM 1200.

Next, processor 1100 resumes a process corresponding to a process ID stored in the temporary memory (S440). For example, where an operation in which a page in which a page fault occurred is written in RAM 1200 is completed in Operation S430, processor 1100 may resume the operation of the process, in which a page fault occurred, by performing a wake-up process on a process that is directed by a process ID stored in the temporary memory.

Otherwise, if it is determined that a page fault does not occur in Operation S410, processor 1200 executes an application process (S450). For example, processor 1200 executes an application process accessed in RAM 1200, based on user interface information.

Figure 12:
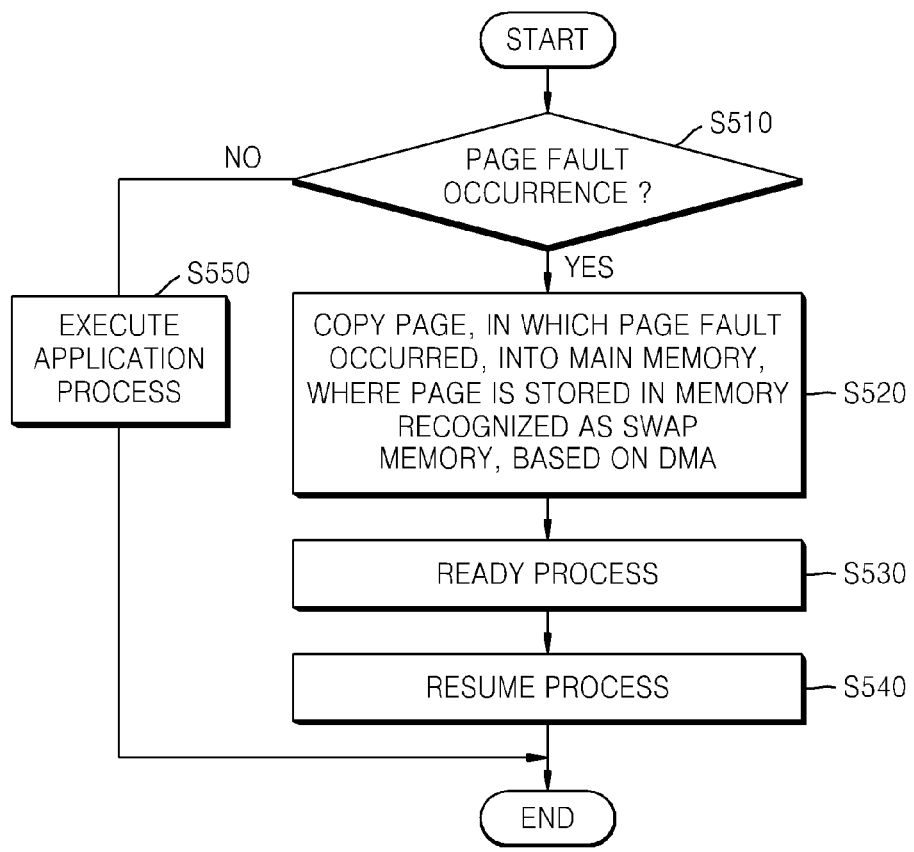
FIG. 12 is a flowchart illustrating a memory swap operation control method according to another embodiment of the inventive concept.

Next, a memory swap operation control method according to another embodiment of the inventive concept is described with reference to the flowchart of FIG. 12.

Processor 1100 determines whether a page fault occurs in the process of performing process access (S510). Because the occurrence of a page fault has been described above with reference to FIG. 11, repeated descriptions thereof are omitted.

If it is determined that a page fault occurs, processor 1100 copies a page, in which a page fault occurred, into RAM 1200 that is a main memory, where the page in which a page fault occurred is stored in memory 1420 of memory system 1400, which is recognized as a swap memory, based on DMA (S520). That is, processor 1100 does not access memory 1420 of memory system 1400 by a storage access process but by a DMA process. Due to this, where a page fault occurs, access to the swap memory may be performed first due to DMA.

Next, processor 1100 prepares to resume a process in which a page fault occurred (S530). For example, after the page in which a page fault occurred is stored in RAM 1200, processor 1100 may perform a wake-up process on processes in which sleep occurred, based on an order depending on an initially set rule.

Where a wake-up process for the process in which a page fault occurred is performed, processor 1100 resumes a process suspended by the page fault (S540).

Otherwise, if it is determined that a page fault does not occur in Operation S510, processor 1200 executes an application process (S550). For example, processor 1200 executes an application process accessed in RAM 1200, based on user interface information.

Figure 13:
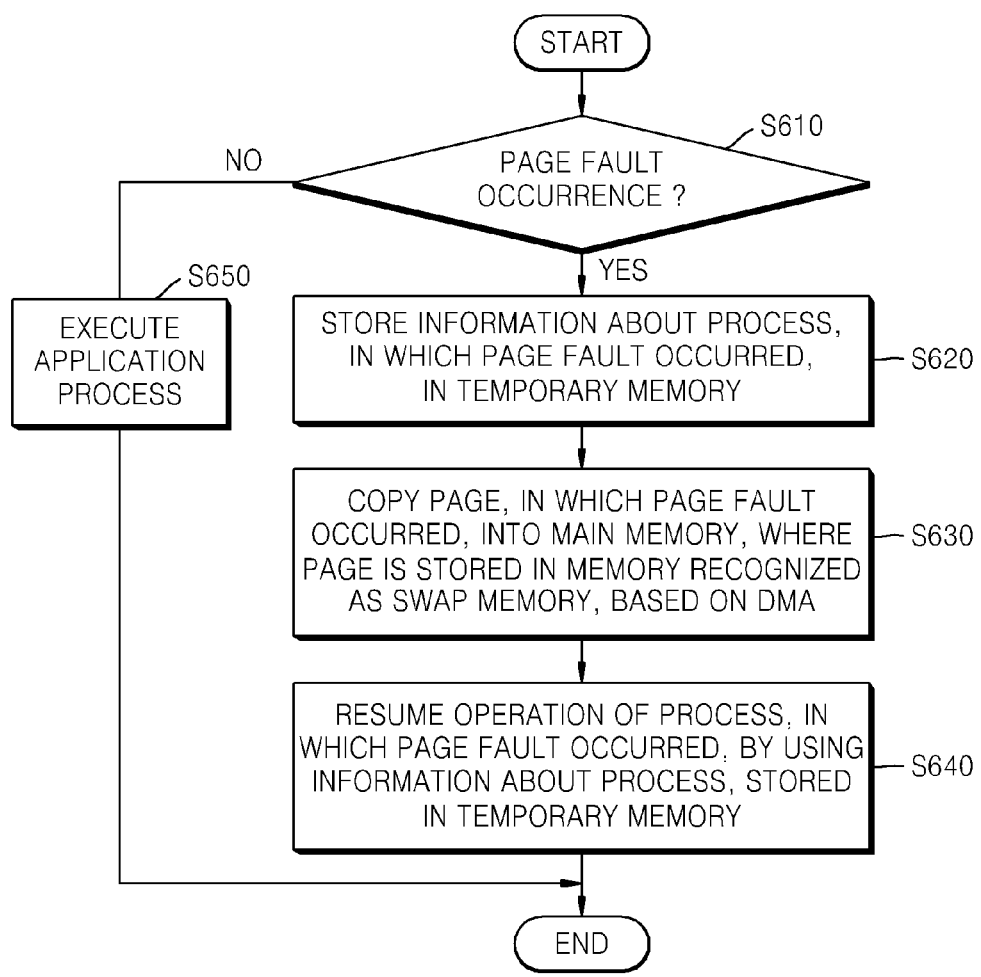
FIG. 13 is a flowchart illustrating a memory swap operation control method according to another embodiment of the inventive concept.

Next, a memory swap operation control method according to another embodiment of the inventive concept is described with reference to the flowchart of FIG. 13.

Processor 1100 determines whether a page fault occurs in the process of performing process access (S610). Because the occurrence of a page fault has been described above with reference to FIG. 11, repeated descriptions thereof are omitted.

Where a page fault occurs, processor 1100 stores information about a process, in which a page fault occurred, in a temporary memory (S620). Because the information about a process, in which a page fault occurred, and the temporary memory have been described in Operation S420 of FIG. 12, repeated descriptions thereof are omitted.

Next, processor 1100 copies a page, in which a page fault occurred, into RAM 1200 that is a main memory, where the page in which a page fault occurred is stored in memory 1420 of memory system 1400, which is recognized as a swap memory, based on DMA (S630). That is, processor 1100 does not access memory 1420 of memory system 1400 by a storage access process but by a DMA process. Due to this, where a page fault occurs, access to the swap memory may be performed first due to DMA.

Next, processor 1100 resumes a process corresponding to a process ID stored in the temporary memory (S640). For example, where an operation in which a page in which a page fault occurred is written in RAM 1200 is completed in Operation S630, processor 1100 may resume the operation of the process, in which a page fault occurred, by performing a wake-up process on a process that is directed by a process ID stored in the temporary memory.

Otherwise, if it is determined that a page fault does not occur in Operation S610, processor 1200 executes an application process (S650). For example, processor 1200 executes an application process accessed in RAM 1200, based on user interface information.

Figure 14:
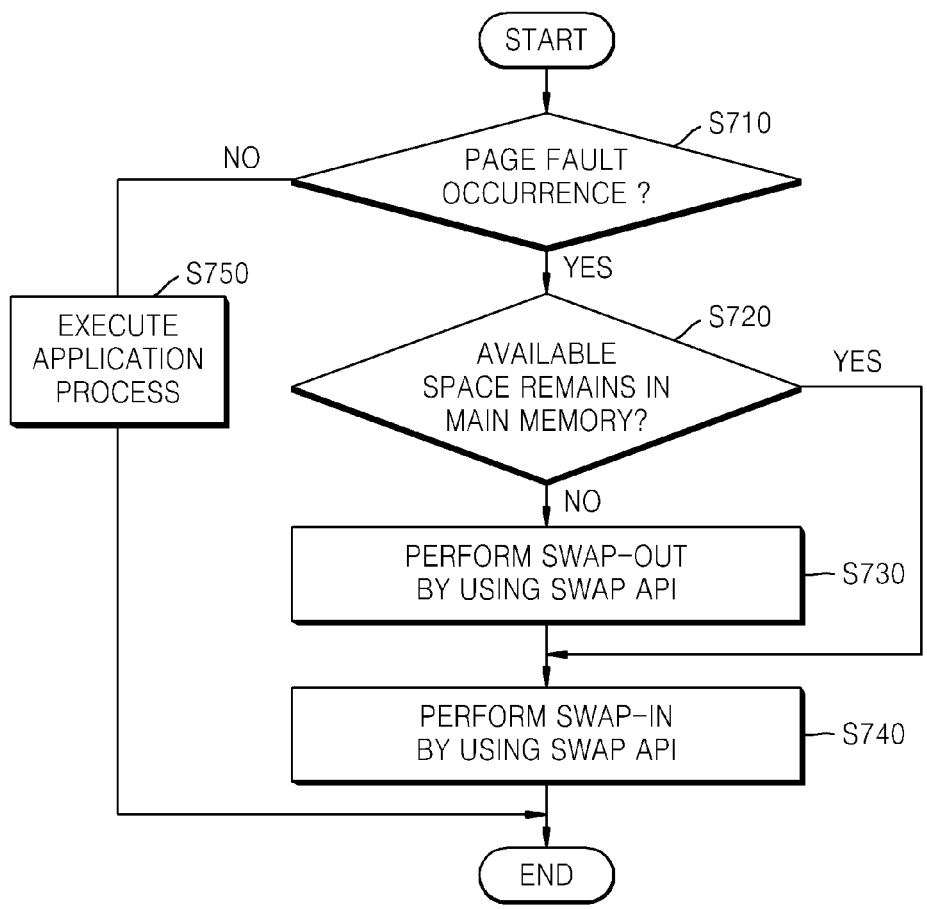
FIG. 14 is a flowchart illustrating a memory swap operation control method according to another embodiment of the inventive concept.

Next, a memory swap operation control method according to another embodiment of the inventive concept is described with reference to the flowchart of FIG. 14.

Processor 1100 determines whether a page fault occurs in the process of performing process access (S710). Because the occurrence of a page fault has been described above with reference to FIG. 11, repeated descriptions thereof are omitted.

If a page fault occurs, processor 1100 determines whether an available space for storing a page in which the page fault occurred remains in RAM 1200 (S720).

If an available space for storing a page in which the page fault occurred does not remain in RAM 1200, processor 1100 performs a swap-out process by using a program Swap API, i.e., any one of the programs Swap API_1, Swap API_2, and Swap API_3 (S730). A swap-out operation for storing at least one page stored in RAM 1200 in memory 1420 of memory system 1400 may be performed by using any one of the programs Swap API_1, Swap API_2, and Swap API_3. For example, pages on which a swap-out process is performed may be determined in order of previously used pages.

For example, a swap-out operation according to the program Swap API_1 may be an operation for writing a page read from RAM 1200 into memory 1420 of memory system 1400, which is recognized as a storage device, based on a storage access process. As another example, a swap-out operation according to the program Swap API_2 or Swap API_3 may be an operation for writing a page read from RAM 1200 into memory 1420 of memory system 1400, which is recognized as a swap memory, based on DMA.

If an available space for storing a page in which the page fault occurred remains in RAM 1200 or after securing an available space through the swap-out operation, processor 1100 performs a swap-in process by using the program Swap API (S740). A swap-in operation for copying a page, in which a page fault occurred, into memory 1420 of memory system 1400 may be performed by using any one of the programs Swap API_1, Swap API_2, and Swap API_3. The swap-in operation using the programs Swap API_1, Swap API_2, and Swap API_3 has been described in detail above, and thus, repeated descriptions thereof are omitted.

Otherwise, if it is determined that a page fault does not occur in Operation S710, processor 1200 executes an application process (S750). For example, processor 1200 executes an application process accessed in RAM 1200, based on user interface information.

Memory systems according to the above-described embodiments may be embedded in any of several types of packages. For example, they may be embedded in package types or configurations such as a package on package (POP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flatpack (TQFP), small outline (SOIC), shrink small outline package (SSOP), thin small outline package (TSOP), system in package (SIP), multi chip package (MCP), wafer-level fabricated package (WFP), and wafer-level processed stack package (WSP).

The foregoing is illustrative of embodiments and is not to be construed as limiting thereof. Although a few embodiments have been described, those skilled in the art will readily appreciate that many modifications are possible in the embodiments without materially departing from the scope of the inventive concept. Accordingly, all such modifications are intended to be included within the scope of the inventive concept as defined in the claims.

What is claimed is:

1. A method of operating a data processing system including a host and a physically separate memory system, the host and memory system being connected via an interface to communicate data, the host including a processor including temporary memory and a main memory storing a swap program controlling execution of a swap operation, the memory system including a controller and a swap memory, and the method comprising:
   recognizing, by the processor, the swap memory as a memory resource connected via the interface;
   executing, by the processor, a process until determining a page fault, wherein the page fault is an attempt by the processor executing the process to read a page that is not stored in the main memory;
   writing, by the processor and in response to determining the page fault, information about the process to the temporary memory, wherein the information comprises request information for copying the page from the swap memory to the main memory;
   copying the page from the swap memory to the main memory via the interface; and
   resuming, by the processor and after copying of the page, the process using the information about the process written in the temporary memory.

2. The method of claim 1, wherein the information about the process comprises an identifier (ID) of the process in which the page fault occurred.

3. The method of claim 1, wherein the temporary memory comprises a register embedded in the processor.

4. The method of claim 1, wherein the determining of the page fault is performed by the processor and comprises suspending execution of the process before writing the information about the process to the temporary memory.

5. The method of claim 1, wherein the copying of the page in which the page fault occurred is performed using direct memory access (DMA).

6. The method of claim 1, wherein the swap memory is larger than the main memory, such that the main memory has inadequate storage space for initially storing the page in which the page fault occurred.

7. The method of claim 1, wherein the processor recognizes at least one memory device connected to the host via the interface providing the swap memory using an operating system.

8. The method of claim 1, wherein resuming of the process comprises performing a wake-up process on a process, as indicated by a process identifier (ID) stored in the temporary memory.

9. A data processing system comprising:
a host connected via an interface to a physically separate memory system, wherein the memory system comprises a controller and a swap memory, and the host comprises a processor including a temporary memory and a main memory storing a swap program, and
the processor recognizes the swap memory as a memory resource connected via the interface, performs data processing including execution of a process based on input information, and drives the swap program in response to a determination of a page fault in which the processor, executing the process, attempts to read a page that is not stored in the main memory, wherein upon driving the swap program the processor:
(1) suspends execution of the process,
(2) writes, in response to suspending execution of the process, information about the process to the temporary memory, wherein the information comprises request information for copying the page from the swap memory to the main memory,
(3) copies the page from the swap memory to the main memory using to a direct memory access (DMA) process, and
(4) resumes execution of the process after copying the page from the swap memory to the main memory.

10. The data processing system of claim 9, wherein the information about the process comprises an identifier (ID) of the process.

11. The data processing system of claim 9, wherein the temporary memory is a register embedded in the processor or the main memory.

12. The data processing system of claim 9, wherein the swap memory comprises at least one of a volatile memory device and a nonvolatile memory device.

13. The data processing system of claim 9, wherein resuming execution of the process comprises performing a wake-up process on a process as identified by a process identifier (ID) stored in the temporary memory.

14. The data processing system of claim 9, wherein the processor executes an operating system including a memory mapping process that operates to cause recognition of the swap memory provided by a memory device connected to the host via the interface.

15. A data processing system comprising:
a host comprising a main memory; and a processor including a temporary memory; and
a memory system comprising a controller and a swap memory larger than the main memory such that the main memory stores only a portion of data stored in the swap memory, wherein:
the host and the memory system are physically separate and connected to communicate data via an interface, and
the processor;
(1) recognizes the swap memory as a memory resource connected via the interface;
(2) executes a process until determining that a page fault has occurred in relation to the data stored in the main memory, wherein the page fault is an attempt by the processor executing the process to read a page that is not stored in the main memory; and thereafter,
(3) suspends, in response to determining the page fault has occurred, execution of the process;
(4) writes, in response to suspending execution of the process, information about the process to the temporary memory, wherein the information comprises request information for copying the page from the swap memory to the main memory,
(5) copies the page from the swap memory to the main memory using a direct memory access (DMA) process; and
(6) resumes execution of the process after copying the page from the swap memory to the main memory.

16. The data processing system of claim 15, wherein the information about the process comprises an identifier (ID) identifying the process for execution by the processor.

17. The data processing system of claim 15, wherein the temporary memory comprises a register embedded in the processor.

* * * * *